(12) United States Patent
Ross

(10) Patent No.: US 12,339,023 B2
(45) Date of Patent: Jun. 24, 2025

(54) ZONING SYSTEM FOR AIR CONDITIONING (HVAC) EQUIPMENT

(71) Applicant: Joseph A. Ross, Auburn, AL (US)

(72) Inventor: Joseph A. Ross, Auburn, AL (US)

( * ) Notice: Subject to any disclaimer, the term of this patent is extended or adjusted under 35 U.S.C. 154(b) by 332 days.

(21) Appl. No.: 17/861,885

(22) Filed: Jul. 11, 2022

(65) Prior Publication Data

US 2022/0412596 A1    Dec. 29, 2022

Related U.S. Application Data

(63) Continuation-in-part of application No. 16/843,253, filed on Apr. 8, 2020, now Pat. No. 11,384,951, which is a continuation-in-part of application No. 15/622,118, filed on Jun. 14, 2017, now abandoned.

(51) Int. Cl.

| | |
|---|---|
| *F24F 11/67* | (2018.01) |
| *F24F 3/044* | (2006.01) |
| *F24F 11/77* | (2018.01) |
| *F24F 110/10* | (2018.01) |
| *F24F 110/30* | (2018.01) |

(Continued)

(52) U.S. Cl.
CPC ............ *F24F 11/67* (2018.01); *F24F 3/0442* (2013.01); *F24F 11/77* (2018.01); *F24F 2110/10* (2018.01); *F24F 2110/30* (2018.01); *F24F 2120/10* (2018.01); *F24F 2140/50* (2018.01); *Y02B 30/70* (2013.01)

(58) Field of Classification Search
CPC .......... F24F 11/67; F24F 3/0442; F24F 11/77; F24F 2110/10; F24F 2110/30; F24F 2120/10; F24F 2140/50; Y02B 30/70
See application file for complete search history.

(56) References Cited

U.S. PATENT DOCUMENTS

| 4,285,390 A | 8/1981 | Fortune |
|---|---|---|
| 4,526,227 A | 7/1985 | Hurt |
| 4,630,670 A | 12/1986 | Osheroff |

(Continued)

FOREIGN PATENT DOCUMENTS

| GB | 2433586 B | 3/2011 |
|---|---|---|
| JP | 2003212719 A | 7/2003 |

(Continued)

*Primary Examiner* — Ljiljana V. Ciric
(74) *Attorney, Agent, or Firm* — Perilla Knox & Hildebrandt LLP

(57) ABSTRACT

A variable air flow air conditioning (HVAC) system is provided, along with methods of use thereof. In example embodiments, one or more variable speed fans or air-moving devices are in communication with ducts connecting one or more zones of a structure or other space to be air conditioned. Zone temperature sensors and air flow measurement are provided to obtain particular measurements relative to the zone it is serving while communicating with a central control. Optionally, a distributed control system can be provided such that zone sensors communicate with both the central control and a respective zone controller. The control system collects and processes multiple data sets to dynamically and proportionally adjust the volumetric air flows of each of the zones to satisfy any loads or heating/cooling demands while also maintaining a net volumetric air flow across a coil of the indoor heat transfer unit within a preset range.

20 Claims, 18 Drawing Sheets

(51) Int. Cl.
*F24F 120/10* (2018.01)
*F24F 140/50* (2018.01)

(56) References Cited

U.S. PATENT DOCUMENTS

| | | | |
|---|---|---|---|
| 5,058,388 A * | 10/1991 | Shaw | F24F 11/77 |
| | | | 62/93 |
| 5,071,065 A | 12/1991 | Halton | |
| 5,180,102 A * | 1/1993 | Gilbert | F24F 3/044 |
| | | | 165/244 |
| 5,197,585 A | 3/1993 | Cheng | |
| 5,279,609 A | 1/1994 | Meckler | |
| 5,664,995 A | 9/1997 | O'Keefe | |
| 5,944,098 A | 8/1999 | Jackson | |
| 6,095,426 A | 8/2000 | Ahmed | |
| 6,227,961 B1 | 5/2001 | Moore | |
| 6,792,766 B2 | 9/2004 | Osborne | |
| 7,017,827 B2 | 3/2006 | Shah | |
| 7,036,559 B2 * | 5/2006 | Stanimirovic | F24F 11/30 |
| | | | 62/127 |
| 7,036,743 B2 | 5/2006 | Shah | |
| 7,334,632 B2 | 2/2008 | Bassilakis | |
| 7,341,201 B2 * | 3/2008 | Stanimirovic | F24F 11/89 |
| | | | 236/94 |
| 7,364,094 B2 | 4/2008 | Bagwell | |
| 7,802,734 B2 * | 9/2010 | Stanimirovic | F24F 11/30 |
| | | | 236/44 C |
| 7,874,499 B2 * | 1/2011 | Lochtefeld | F24F 3/06 |
| | | | 236/44 C |
| 8,052,062 B2 | 11/2011 | Stark | |
| 8,147,302 B2 * | 4/2012 | Desrochers | F24F 11/46 |
| | | | 702/50 |
| 8,374,725 B1 | 2/2013 | Ols | |
| RE44,146 E | 4/2013 | Bagwell | |
| 8,543,244 B2 | 9/2013 | Keeling | |
| 8,727,701 B2 | 5/2014 | Hopkins | |
| 9,155,226 B2 | 10/2015 | Huang | |
| 9,158,310 B2 | 10/2015 | Geissler | |
| 9,322,568 B2 | 4/2016 | Aycock | |
| 9,810,469 B2 | 11/2017 | Boehde | |
| 10,088,821 B2 * | 10/2018 | Karamanos | G05B 19/042 |
| 10,215,431 B2 | 2/2019 | Dempsey | |
| 10,386,800 B2 | 8/2019 | Ahmed | |
| 10,408,486 B2 | 9/2019 | Boody | |
| 10,444,771 B2 | 10/2019 | Karamanos | |
| 10,649,419 B2 * | 5/2020 | Asp | G06Q 50/06 |
| 10,677,489 B2 * | 6/2020 | Puranen | F24F 11/74 |
| 11,283,669 B1 * | 3/2022 | Przybylski | H04L 41/12 |
| 11,314,788 B2 * | 4/2022 | Park | G05B 15/02 |
| 11,384,951 B2 | 7/2022 | Ross | |
| 11,445,024 B2 * | 9/2022 | Turney | G16Y 40/35 |
| 11,519,632 B2 * | 12/2022 | Burks, III | F24F 11/72 |
| 11,698,646 B2 * | 7/2023 | Karamanos | G01F 1/363 |
| | | | 236/1 B |
| 11,761,660 B2 * | 9/2023 | Drees | F24F 11/56 |
| | | | 700/276 |
| 11,761,663 B2 * | 9/2023 | Elbsat | G05D 23/1934 |
| | | | 700/276 |
| 11,859,851 B2 * | 1/2024 | Voysey | F24F 11/74 |
| 12,032,395 B2 * | 7/2024 | Karamanos | G01F 15/003 |
| 12,078,367 B2 * | 9/2024 | Albinger | F24F 11/89 |
| 12,147,253 B2 * | 11/2024 | Karamanos | F24F 11/30 |
| 2005/0277381 A1 | 12/2005 | Banerjee | |
| 2009/0170420 A1 | 7/2009 | Dubensky | |
| 2010/0307733 A1 * | 12/2010 | Karamanos | F24F 11/84 |
| | | | 165/254 |
| 2012/0253524 A1 | 10/2012 | Norrell | |
| 2013/0344788 A1 | 12/2013 | Buch | |
| 2018/0187915 A1 * | 7/2018 | Nelson | F24F 13/20 |
| 2019/0249896 A1 | 8/2019 | Iyer | |
| 2020/0132318 A1 * | 4/2020 | Prather | F24F 11/76 |
| 2020/0132324 A1 * | 4/2020 | Rigg | F24F 11/72 |
| 2020/0284463 A1 * | 9/2020 | Atchison | F24F 11/79 |
| 2020/0340704 A1 * | 10/2020 | Ross | F24F 11/30 |
| 2022/0049868 A1 * | 2/2022 | Chauhan | F24F 11/63 |
| 2022/0120468 A1 * | 4/2022 | Burks, III | F24F 11/62 |
| 2022/0191084 A1 * | 6/2022 | Przybylski | G16Y 20/30 |
| 2022/0412596 A1 * | 12/2022 | Ross | F24F 3/0442 |
| 2025/0109876 A1 * | 4/2025 | Risbeck | F24F 11/64 |

FOREIGN PATENT DOCUMENTS

| | | |
|---|---|---|
| KR | 920701762 A | 8/1992 |
| NZ | 232650 A | 2/1992 |
| WO | 1990010180 A1 | 9/1990 |
| WO | 2005073637 A1 | 8/2005 |
| WO | 2008010208 A2 | 1/2008 |
| WO | 2013142105 A1 | 9/2013 |

* cited by examiner

| | | | |
|---|---|---|---|
| INITIAL SET-UP PARAMETERS: | | | |
| 3 | Nominal Tons, System Capacity based on professional design(Installer Input requires level 1 access to change) | | |
| 1,200 | Design CFM (calculated from default) | 400 | Default (requires level 2 access to change) |
| 1,050 | Minimum CFM (calculated from default) | 350 | Default (requires level 2 access to change) |
| 1,350 | Maximum CFM (calculated from default) | 450 | Default (requires level 2 access to change) |
| O/U | Occupied/ Unoccupied Mode (installer inputs for schedules, may be from CO2 or other sensor input) | | |
| Ta | Unoccupied zone a Temperature Set-point | | |
| Tb | Unoccupied zone b Temperature Set-point | | |
| Tc | Unoccupied zone c Temperature Set-point | | |
| Td | Unoccupied zone d Temperature Set-point | | |
| Te | Unoccupied zone e Temperature Set-point | | |
| Tf | Unoccupied zone f Temperature Set-point | | |
| FLmin-a | Minimum CFM Zone a (based in fan specifications) | | |
| FLmin-b | Minimum CFM Zone b (based in fan specifications) | | |
| FLmin-c | Minimum CFM Zone c (based in fan specifications) | | |
| FLmin-d | Minimum CFM Zone d (based in fan specifications) | | |
| FLmin-e | Minimum CFM Zone e (based in fan specifications) | | |
| FLmin-f | Minimum CFM Zone f (based in fan specifications) | | |
| FLmax-a | Maximum CFM Zone a (per design specifications) | | |
| FLmax-b | Maximum CFM Zone b (per design specifications) | | |
| FLmax-c | Maximum CFM Zone c (per design specifications) | | |
| FLmax-d | Maximum CFM Zone d (per design specifications) | | |
| FLmax-e | Maximum CFM Zone e (per design specifications) | | |
| FLmax-f | Maximum CFM Zone f (per design specifications) | | |
| Hsp | Humidity Set-point | | |
| PID | Multiple Parameters for PID control | | |
| OPERATOR INPUTS: | | | |
| Tsp-a | Occupied zone a Temperature Set-point | | |
| Tsp-b | Occupied zone b Temperature Set-point | | |
| Tsp-c | Occupied zone c Temperature Set-point | | |
| Tsp-d | Occupied zone d Temperature Set-point | | |
| Tsp-e | Occupied zone e Temperature Set-point | | |
| Tsp-f | Occupied zone f Temperature Set-point | | |
| SYSTEM INPUTS: | | | |
| TS | Supply Temperature, the temperature of the air leaving the IHTU | | |
| TR | Return Temperature, the temperature of the air entering the IHTU | | |
| H | Humidity Measurement | | |
| ZONE INPUTS: | | | |
| Tz | Zone Temperature | | |
| FLz | Zone flow (measurement) | | |
| Oz | Zone Occupancy (optional measurement) | | |
| CO2z | Zone CO2 (optional measurement) | | |
| ZONE OUTPUTS: | | | |
| FVz | Fan Reference Voltage (0-10VDC) | | |
| SYSTEM OUTPUTS: | | | |
| C1 | Call for Cooling - stage 1 | | |
| C2 | Call for Cooling - stage 2 | | |
| C3 | Call for Cooling - stage 3 | | |
| H1 | Call for Heating - stage 1 | | |
| H2 | Call for Heating - stage 2 | | |
| H3 | Call for Heating - stage 3 | | |

FIG. 10

EXAMPLE SYSTEM:
*Actual values shall depend upon actual Architecture and determined by design professionals using accepted parctices.*

| ROOM | Description | Design CFM | Humidity Control CFM | Minimum CFM (per zone) | | Maximum CFM (per zone) |
|---|---|---|---|---|---|---|
| a | Entry | 100 | | 30 | | 130 |
| b | Dining | 200 | | 60 | | 260 |
| c | Office | 250 | | 75 | | 325 |
| d | Bedroom | 250 | | 75 | | 325 |
| e | Living | 200 | | 60 | | 260 |
| f | Kitchen | 200 | | 60 | | 260 |
| | | 1,200 | 1,050 | | | |

1 Example Calculation (Air Conditioning without dehumidification) — FL(min) & FL(max) substitutions

| ROOM | Description | Temp (measured) °F | Temp (set-point) °F | ΔT °F | PID SCALE FACTOR | | Flow CFM (measured) | First adj | Second adj | Min CFM | Pass-thru Values In Range | Max CFM | Final FL Adjustment (CFM) |
|---|---|---|---|---|---|---|---|---|---|---|---|---|---|
| a | Entry | 85 | 75 | 10 | 100 | 77% | 100 | 177 | 161 | | | 130 | 130 |
| b | Dining | 75 | 75 | 0 | 0 | 0% | 200 | 200 | 182 | | 182 | | 188 |
| c | Office | 75 | 75 | 0 | 0 | 0% | 250 | 250 | 228 | | 228 | | 235 |
| d | Bedroom | 78 | 80 | -2 | -20 | -15% | 250 | 212 | 193 | | 193 | | 199 |
| e | Living | 75 | 75 | 0 | 0 | 0% | 200 | 200 | 182 | | 182 | | 188 |
| f | Kitchen | 80 | 75 | 5 | 50 | 38% | 200 | 277 | 253 | | 253 | | 260 |
| | | | | | 130 | 100% | 1,200 | 1,315 | 1,200 | | 1,169 | | 1,200 |

Total Flow (CFM) Set-Point for Relative Humidity below 50% ===> 1,200

2 Example Calculation (Air Conditioning with dehumidification)

| ROOM | Description | Temp (measured) °F | Temp (set-point) °F | ΔT °F | PID SCALE FACTOR | | Flow CFM (measured) | First adj | Second adj | Min CFM | Pass-thru Values In Range | Max CFM | Final FL Adjustment (CFM) |
|---|---|---|---|---|---|---|---|---|---|---|---|---|---|
| a | Entry | 75 | 75 | 0 | 0 | 0% | 130 | 130 | 119 | | 119 | | 121 |
| b | Dining | 75 | 75 | 0 | 0 | 0% | 158 | 158 | 145 | | 145 | | 147 |
| c | Office | 76 | 75 | 1 | 10 | 100% | 198 | 396 | 362 | | | 325 | 325 |
| d | Bedroom | 75 | 75 | 0 | 0 | 0% | 148 | 148 | 136 | | 136 | | 138 |
| e | Living | 76 | 75 | 1 | 10 | 100% | 158 | 317 | 289 | | | 260 | 260 |
| f | Kitchen | 74 | 75 | -1 | -10 | -100% | 257 | 0 | 0 | 60 | | | 60 |
| | | | | | 10 | 100% | 1,050 | 1,149 | 1,050 | | 1,044 | | 1,050 |

Total Flow (CFM) Set-Point for Relative Humidity above 50% ===> 1,050

3 Example Calculation (Heating) — FL(min) & FL(max) substitutions

| ROOM | Description | Temp (measured) °F | Temp (set-point) °F | ΔT °F | PID SCALE FACTOR | | Flow CFM (measured) | First adj | Second adj | Min CFM | Pass-thru Values In Range | Max CFM | Final FL Adjustment (CFM) |
|---|---|---|---|---|---|---|---|---|---|---|---|---|---|
| a | Entry | 66 | 68 | -2 | -20 | 29% | 100 | 129 | 110 | | 110 | | 112 |
| b | Dining | 68 | 68 | 0 | 0 | 0% | 200 | 200 | 171 | | 171 | | 174 |
| c | Office | 68 | 68 | 0 | 0 | 0% | 250 | 250 | 214 | | 214 | | 217 |
| d | Bedroom | 68 | 72 | -4 | -40 | 57% | 250 | 393 | 337 | 325 | | | 325 |
| e | Living | 68 | 68 | 0 | 0 | 0% | 200 | 200 | 171 | | 171 | | 174 |
| f | Kitchen | 67 | 68 | -1 | -10 | 14% | 200 | 229 | 196 | | 196 | | 199 |
| | | | | | -70 | 100% | 1,200 | 1,400 | 1,200 | | 1,188 | | 1,200 |

Total Flow (CFM) Set-Point for Heating ===> 1,200

Factors consdered in design:
1) Building Design/orientation
2) Building Envelope:
    a) Insulation
    b) Materials of Construction
3) Lighting, appliances
4) Ventilation/ infiltration
5) Occupancy/ activity

FIG. 11

SCHEMATIC FOR
VAF ENHANCED
EMBODIMENT

EXAMPLE 1, SENARIO 1

MORNING SUN, INDIVIDUAL OCCUPANT
f1: ACTIVE, FOLLOWING SCHEDULE
f2: IDLE
f3: IDLE
f4: IDLE
f5: IDLE
f6: IDLE
f7: IDLE
f8: IDLE
f9: IDLE
f10: ACTIVE, TRACKING SMART WATCH

EXAMPLE 1, SENARIO 2

AFTERNOON SUN, INDIVIDUAL OCCUPANT
f1: IDLE
f2: IDLE
f3: IDLE
f4: ACTIVE, TRACKING SMART WATCH
f5: IDLE
f6: IDLE
f7: IDLE
f8: ACTIVE, FOLLOWING SCHEDULE
f9: IDLE
f10: IDLE

EXAMPLE 1, SENARIO 3

EARLY EVENING, TV NIGHT
f1: IDLE
f2: IDLE
f3: IDLE
f4: IDLE
f5: ACTIVE, TRACKING SMART WATCH
f6: IDLE
f7: ACTIVE, TRACKING SMART WATCH
f8: ACTIVE, TRACKING SMART WATCH
f9: ACTIVE, INTERLOCK WITH TV OPERATION
f10: IDLE

EXAMPLE 1, SENARIO 4

LATE EVENING, ENJOYING A FIRE
f1: IDLE
f2: ACTIVE, TRACKING SMART WATCH
f3: ACTIVE, BY PROGRAM OVERIDE VIA f2 SMART WATCH
f4: IDLE
f5: IDLE
f6: IDLE
f7: IDLE
f8: IDLE
f9: IDLE
f10: IDLE

ZONING SYSTEM FOR AIR CONDITIONING (HVAC) EQUIPMENT

CROSS-REFERENCE TO RELATED APPLICATION

This application is a continuation-in-part patent application, which claims the priority benefit of U.S. Non-provisional patent application Ser. No. 15/622,118, filed Jun. 14, 2017, and now abandoned, as well as U.S. Non-provisional patent application Ser. No. 16/843,253, filed Apr. 8, 2020, the entirety of which are incorporated by reference herein.

TECHNICAL FIELD

The present disclosure relates generally to a heating and air conditioning system, and more specifically to a multi-zone forced air heating and air conditioning system.

BACKGROUND

Controlling the volume of heated or cooled air distributed to different areas of a multiple zone system has been primarily accomplished with a VAV (variable air volume) damper system. VAV systems include a thermostat which is typically located in an occupied space and controls a damper, which limits the primary air flow from a central air handler. VAV systems are often deficient in that control of the air volume is managed by the damper, which creates a high pressure upstream of the damper and a lower pressure downstream of the damper. This lower downstream pressure is negatively affected by friction losses in ductwork, grills and diffusers which limit the VAV system's ability to efficiently distribute air to remote areas of the multiple zone system. Some systems seek to eliminate the duct losses downstream of the damper by locating the damper in the air outlet grille, but this complicates the control of the system and also creates the potential for increased noise as the velocity of the air increases locally as the damper closes.

Another deficient aspect of the VAV system is that the higher pressure on the upstream side can be considerable for the system to perform as designed, and thus creates energy loss. Due to the need for larger fan motor(s) in the central air handler, the VAV damper creates a restriction and the duct energy losses are increased with higher pressures and air velocities. Another disadvantage is the additional integrity provision needed on the high-pressure ductwork to reduce leaks. Modern VAV systems reduce these energy losses for part-load operation with variable speed operation of the central fan motor, but this further reduces the effectiveness of the downstream air distribution system. This strategy is further limited by the range of air flow required by conditioning system.

And as anyone trained and versed in the art of air conditioning is aware, the evaporator portion of a conventional AC system must operate within a limited range of air flows for the for the basic operation of the refrigeration cycle of the working fluid (Freon, ammonia, etc.) through the heat transfer element (coil) conditioning the air stream delivered to the occupied space being served by that system. If the air flow rate through the coil is too little, the coil will get too cold and freeze the condensate and plug the coil resulting in system shutdown and failure. If the air flow rate is too high, the temperature of the air leaving the coil will rise above saturated conditions and moisture will remain in the air stream increasing humidity in the space.

In fact, some have attempted fan powered multi zone systems, however, they all have a deficiency in that they can they do not have a means of controlling air flow across the heat transfer coil within acceptable ranges required for commercially available HVAC equipment. The volume of air moving over the heat transfer coil in the indoor heat transfer unit (ITHU) is critical to the operation and effectiveness of conventional Direct Expansion (DX) air conditioning systems. Too small of a flow volume and the coil will freeze and the system will cease to function. Conversely, with too high of an air flow volume (for any type of AC system) through the heat transfer coil, the air temperature will not be reduced below the saturation temperature and the system will fail to remove humidity from the supply air stream. Multi-zone fan powered systems (Cohen: PCT/IL2007/000833) do not address the issue of combined air flow through the IHTU. In one instance (Jacob: PCT/AU90/00068) this issue was addressed by modulating the capacity of the compressor (or the outdoor component of the IHTU), both of which are either inoperable or not commonly available and require extensive controls which are not commonly understood and implemented. Further, the controls and equipment thereof to allow for modulating the capacity of the compressor are not economically viable for most common installations.

Accordingly, it can be seen that needs exist to improve HVAC control systems to improve efficiency and effectiveness for multi-zone systems. It is to the provision of a zoning system for air conditioning (HVAC) equipment (and systems and methods thereof) meeting these and other needs that the present invention is primarily directed.

SUMMARY

In example embodiments, the present disclosure solves the problem of simultaneously optimizing a unitary Air Conditioning (AC) system while also satisfying the requirements of individual zones. Individual zones systems do not have the means for reconciling their demands with the net conditions needed to optimize the heat transfer system. The systems and methods as described herein are intended to monitor and operate the air moving portion of a conventional AC system, but could be applied to any combination of cooling and/or heating systems such as refrigeration (including variable compressor systems), hydronic, resistance heat, vapor compression, gas furnace, thermoelectric/peltier, etc.

In one aspect, the present disclosure describes a method for achieving air conditioning zones without restrictive dampers. The method dynamically adjusts the air balance of an air conditioning system to match the supply of conditioned air (i.e., air that has been conditioned to be hot or cold) to the thermal demands of the zones it serves. The method optimizes the effectiveness of an air conditioning system by directing the thermal capacity of the system to the zones requiring service without overcompensating in non-demanding zones.

In another aspect, the present disclosure relates to a system for distributing conditioned air to a plurality of zones. The system includes an indoor heat transfer unit for thermally conditioning air and a plurality of fans which are operably connected to the indoor heat transfer unit to draw a volume of thermally conditioned air from the indoor heat transfer unit and direct the volume of the thermally conditioned air to a plurality of zones. The plurality of fans continuously monitor and control the volume of thermally conditioned air directed to each of the plurality of zones. Each of the plurality of fans are independently operable.

In still another aspect, the present disclosure relates to a method to automatically adjust the air balance of a heating ventilation and air conditioning system (HVAC). The method includes directing a measured volumetric rate of air through at least two adaptive distribution and control elements positioned remotely in at least two respective air circuit paths.

In yet another aspect, the present disclosure relates to a system for distributing conditioned air to at least one remote zone. The system includes an indoor heat transfer unit for thermally conditioning air and at least one fan that is operably connected to the indoor heat transfer unit to draw a volume of thermally conditioned air from the indoor heat transfer unit and direct the volume of the thermally conditioned air to at least one remote zone. The at least one fan continuously monitors and controls the volume of thermally conditioned air directed to the at least one remote zone. The at least one fan is positioned remotely from the indoor heat transfer unit. The operable connection between the indoor heat transfer unit and at least one of the plurality of fans is damperless.

In still another aspect, the present disclosure relates to a method for distributing conditioned air to a plurality of zones. The method includes thermally conditioning a volume of air with indoor heat transfer unit. The method also includes drawing the volume of thermally conditioned air from the indoor heat transfer unit with a plurality of fans operably connected to the indoor heat transfer unit. The method also includes directing the volume of the thermally conditioned air to a plurality of zones with the plurality of fans. The plurality of fans continuously monitors and controls the volume of thermally conditioned air directed to each of the plurality of zones. Each of the plurality of fans is independently operable.

According to example embodiments, a central controller activates or deactivates, dynamically increasing or decreasing the volumetric flow rate of the plurality of fans so as to optimize the degree of control to each of the plurality of zones as demanded by thermal loads of the plurality of zones to better decouple the thermal loads from a supply capacity of conditioned air provided by the indoor heat transfer unit. In example embodiments, the central controller adjusts the speed of each individual fan of the plurality of fans to provide a volume of air flow to match the thermal load of the zone it serves while maintaining the net air flow through the heat transfer element of the air conditioning system at a fixed volumetric rate predetermined by the system's thermal capacity and user performance goals.

In example embodiments, the central controller includes a PID controller, and wherein the PID controller is configured to account for and perform one or more calculations relating to a temperature difference for each of the plurality of zones between each respective set-point temperature and measured temperature, individual measured air flow rates within each duct, and the preset air flow rate, the PID controller summing the measured air flow rates and comparing it to the preset air flow rate to calculate a proportional multiplier, the proportional multiplier being multiplied by the prior-measured air flow rates to determine values for adding to the prior-measured air flow rates to obtain a set of first adjustment values. In example embodiments, the PID controller is configured to again measure the individual air flow rates passing through each duct such that the sum thereof is compared to the preset air flow rate to obtain a multiplier for proportionally adjusting the individual air flow rates to obtain a set of second adjustment values. In example embodiments, the central controller is configured to conduct a substitution process of the set of second adjustment values, wherein the values remain the same if they fall within a preset air flow range and wherein the values are substituted with a maximum or minimum preset air flow rate if the value thereof exceeds the maximum or minimum preset air flow rate.

In yet another aspect, the present invention relates to a method of cooling or heating a structure having at least two zones, the structure including an outdoor compressor, an indoor heat transfer unit and heat pump, the structure having ducts connected between the indoor heat transfer unit and the zones, each of the ducts having an individual fan in communication therewith to draw air from the indoor heat transfer unit and across a coil to the desired zone at the desired rate, so long as the sum of the volumetric air flows through the ducts remains at a preset volumetric air flow rate. The method includes drawing air across the heat transfer coil of the indoor heat transfer unit at the preset volumetric air flow rate; measuring individual air flows rates of the at least two zones within at least a portion of the ducts such that air flow signals generated by the measuring thereof are sent to a control system for processing; summing the individual zone air flow signals in the control system to generate an instantaneous measured net volumetric air flow rate for the entire air volume moving across the coil of the indoor heat transfer unit; comparing the measured net volumetric air flow rate to the preset volumetric air flow rate; and proportionally adjusting the individual air flow rates to maintain the instantaneous measured net volumetric air flow rate at the preset volumetric air flow rate as if there was a single fan operating the system.

In yet another aspect, the present invention relates to a variable air flow air conditioning system for conditioning the air of multiple zones of a structure including an air conditioning unit having a heat transfer element; a plurality of ducts extending from the air conditioning unit to each of the multiple zones; a plurality of variable speed fans, wherein at least one fan is positioned to communicate within its respective duct between the air conditioning unit and the multiple zones; a plurality of zone sensors, wherein at least one zone sensor is positioned within each respective zone of the multiple zones so as to provide temperature measurements of the zones thereof; a plurality of air flow sensors, wherein at least one air flow sensor is positioned within each respective duct so as to obtain the volumetric flow rate of the conditioned air flowing from the air conditioning unit; and a controller configured to communicate with the air conditioning unit, the variable speed fans and the air flow sensors, wherein the central controller activates or deactivates so as to dynamically increase or decrease the volumetric flow rate of the plurality of fans so as to optimize the degree of control to each of the multiple zones as demanded by thermal loads of the plurality of zones, and wherein the central controller adjusts the speed of each individual fan of the plurality of fans to provide a volume of air flow to match the thermal load of the zone it serves while maintaining a net volumetric air flow rate through the heat transfer element of the air conditioning unit at a preset volumetric air flow rate predetermined by the system's thermal capacity and user performance goals.

In example embodiments, the air conditioning unit is a split system including outdoor compressor, an indoor heat transfer unit, and a heat pump. In other example embodiments, the air conditioning unit is a packaged system including a compressor, a heat transfer unit and a heat pump.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 10 is a table listing multiple parameters, inputs, outputs and numerical values to be used with the system of FIG. 5 according to an example embodiment of the present invention.

FIG. 11 shows charts including example parameters to be used in first thru third example calculations according to the system of FIG. 5.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
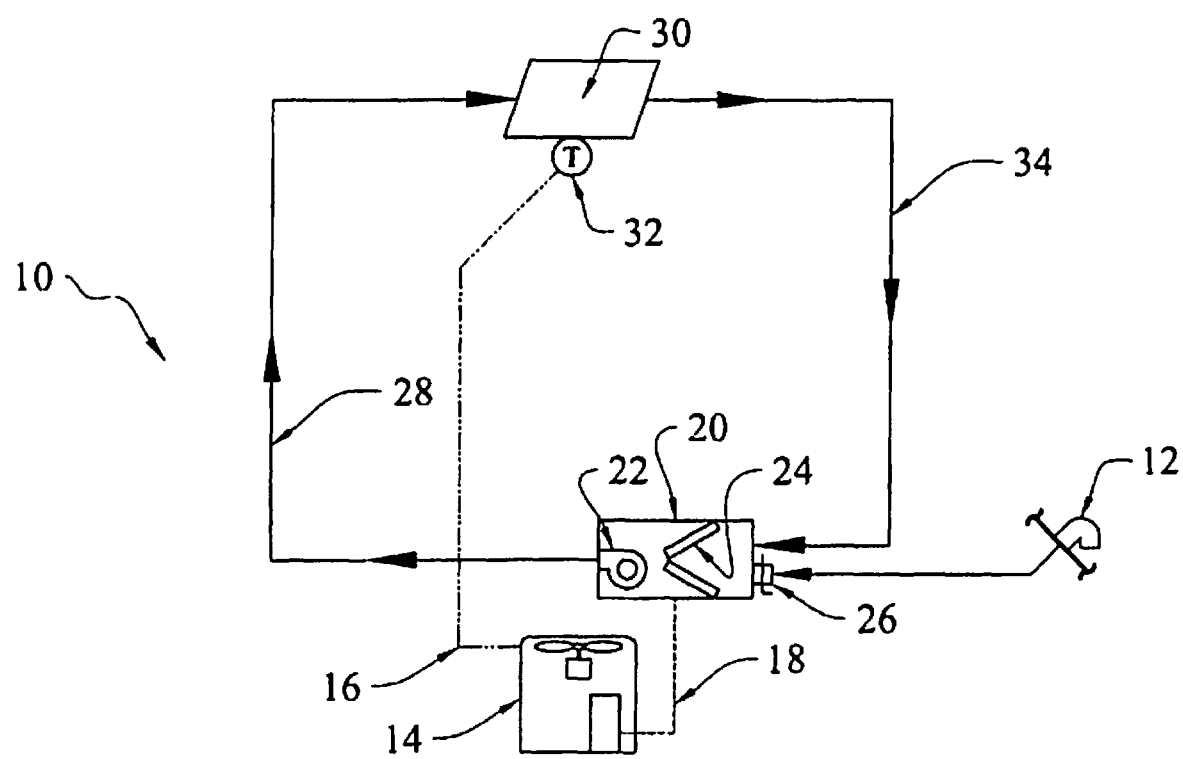
FIG. 1 is a schematic block diagram of a conventional heating and air conditioning system, as is known in the art.

Common HVAC systems, for example as illustrated in FIG. 1, circulate conditioned air to a single zone inside a structure. The example system 10 also includes an indoor unit 20 and an outdoor unit 14. A thermostat control 16 is commonly located in the conditioned space in the air path near the return grille. The outdoor unit 14 can include a condensing unit and/or a heat pump unit. The heat transfer fluid (typically Freon, water, glycol, etc.) is transferred by piping line 18 from outdoor unit 14 to indoor unit 20.

Outside air supplied to the indoor unit 20 is commonly limited with a manual damper, but can also include an outside air control 26, such as a motor operated damper (not shown). In some examples, an outside air intake 12 can optionally be provided, particularly for newer code compliant installations. The indoor unit 20 can also include a filter (not shown), a heating-and-cooling coil 24 and a fan 22. Conventional indoor units 20 include the fan 22 positioned very close to the heating-and-cooling coil, commonly within the same housing or a directly connected housing forming an indoor unit, also called an evaporator or air handler. The indoor unit 20 is operably connected to an air path 28, such as a plenum and/or ductwork. The fan 22 directs hot or cool conditioned air from the indoor unit 20 into the air path 28. The air path 28, through the duct work and/or plenum, continues between the indoor unit 20 and a remote zone 30. The remote zone 30 includes a thermostat 32, which operably manipulates the desired temperature in the zone. In use, the heating-and-cooling coil in the indoor unit 20 adjusts the temperature of the air delivered to the supply air path 28 as the outdoor unit 14 cycles on and off under the control of the thermostat. The system 10 then includes a common return air path 34 to direct air from the remote zone 30 back to the indoor unit 20. The return air path 34 can include structures for directing air, such as grilles, ductwork and filters.

Figure 2:
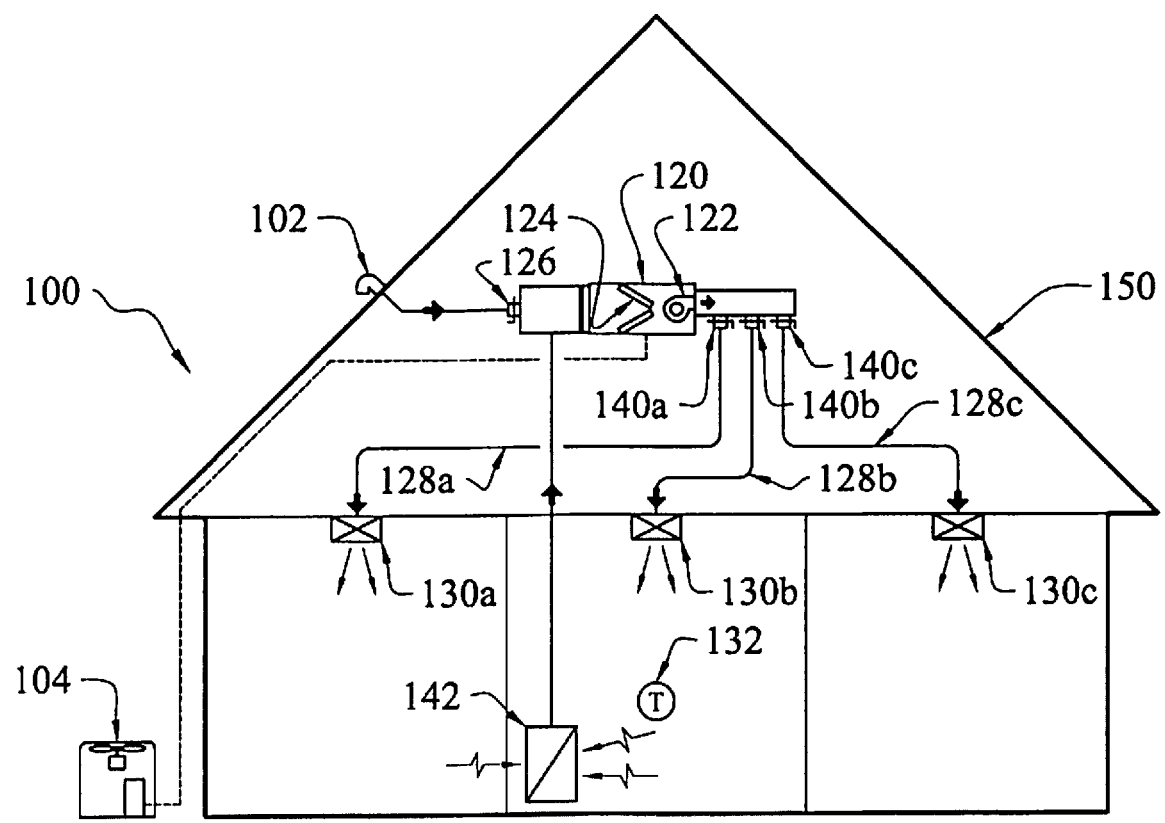
FIG. 2 is a schematic diagram of a conventional single-zone variable air volume system, as is known in the art.

Systems such as the example illustrated in FIG. 1 can be reconfigured as a multi-zone system 100 in a structure such as a house 150, as illustrated in FIG. 2. The illustrated multi-zone system 100 includes an outdoor unit 104, and outside air control 126, an indoor unit 120 with a heating-and-cooling coil 124, a fan 122 and can optionally include an outside air intake 102. The heated or cooled air directed from the fan 122 is managed by a series of motor operated control dampers. The example dampers can be mounted in terminal units, also called VAV boxes 140a-c, which limit the air flow to individual air paths 128a-c. Each air path 128a-c extends between a respective VAV box 140a-c and a respective zone 130a-c. Each VAV box 140a-c controls the amount of heated or cooled air entering an air path 128a-c from the fan 122.

A thermostat can be located in the space for each zone which provides control for each VAV box 140a-c. An example thermostat located in the space for each zone can limit the amount of air directed through the air paths, thus providing a distinct temperature control for the three separate zones 130a-c.

For this example, a common return is shown to provide an intake to ductwork, which returns the air path 142 from the zones 130a-c to the indoor unit 120. Alternatively, individually ducted return air path schemes (not shown) can function similarly.

A VAF (variable air flow) system eliminates fans from the central air handler and also eliminates dampers, which creates conditioning zones. Each zone in the VAF system has a thermostat and is served by its own variable speed fan which pushes the air to its designated area through a standard system of ducts and diffusers. This distributed network of fans is controlled by a central controller which adjusts the speed of each individual fan to provide the volume of air flow to match the load of the zone it serves and it also maintains the net air flow through the heat transfer element of the air conditioning system which often has a specific range of operation. This VAF system moves the higher-pressure air flow downstream of the control mechanism to allow the system to overcome limitations imposed by the layout/geometry/configuration of conditioned space and provide for a more responsive system with less fan energy.

The VAF system includes a network of fans and an arrangement of ductwork to allow air to be pulled from an indoor heat transfer unit (IHTU) and distribute by a specific fan to the zone it serves. Essentially, the IHTU functions as an indoor unit without a fan. The fans are driven with variable speed motors to adjust the volume of air being provided to the zones. The fans have features and instrumentation to measure the volume of air being provided to the zones. Each zone has a thermostat which measures the temperature of the space and allows the occupant to enter the target (or set-point) temperature for the space. In addition to thermal inputs, the control system can account for schedule, occupancy, priority, relative humidity, and ventilation requirements (with instrumentation sensing items such as: Humidity, Occupancy, $CO_2$, Indoor Air Quality, VOC, CO, etc.). The control system also maintains the total volume of air through the IHTU within the acceptable range of operation of the equipment. This air volume is further adjusted for system priorities such as humidity control, thermal accuracy, and energy efficiency.

Figure 3:
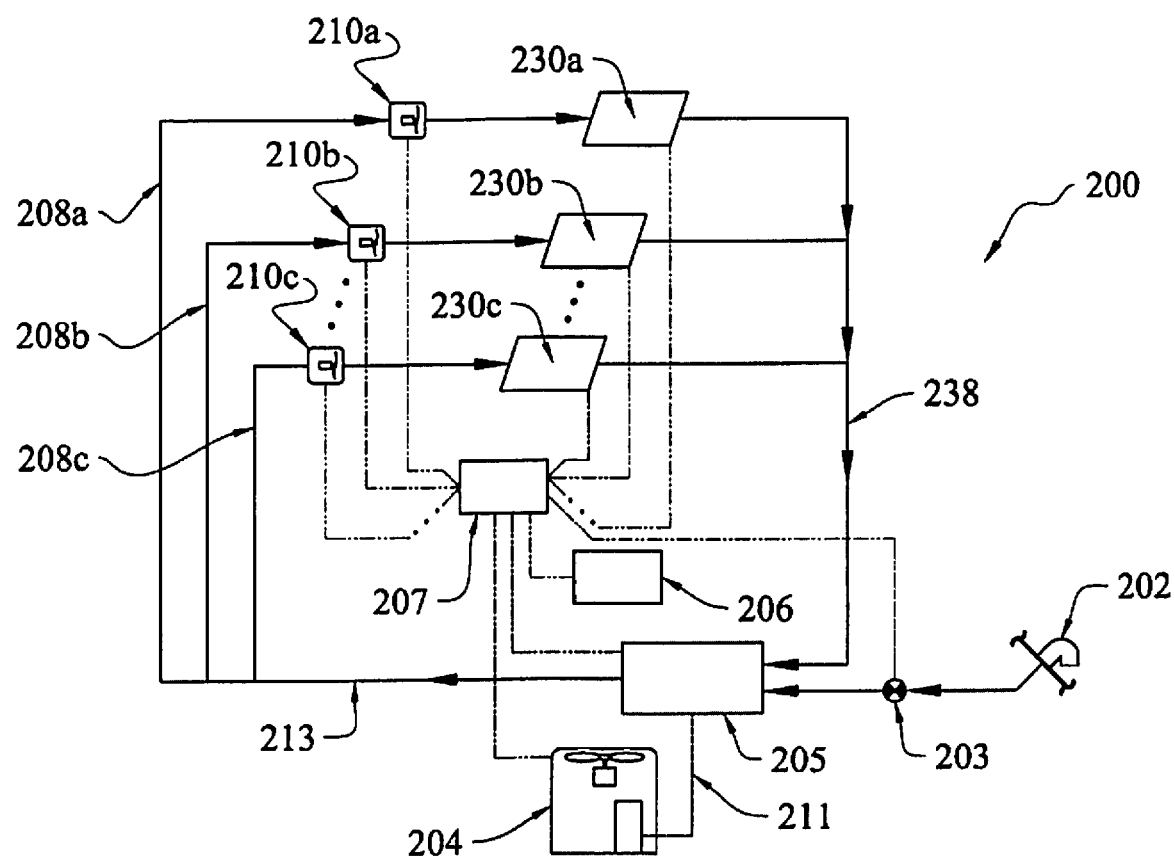
FIG. 3 is a schematic block diagram of a variable air flow heating and air conditioning system, according to an example embodiment of the present disclosure.
Figure 4:
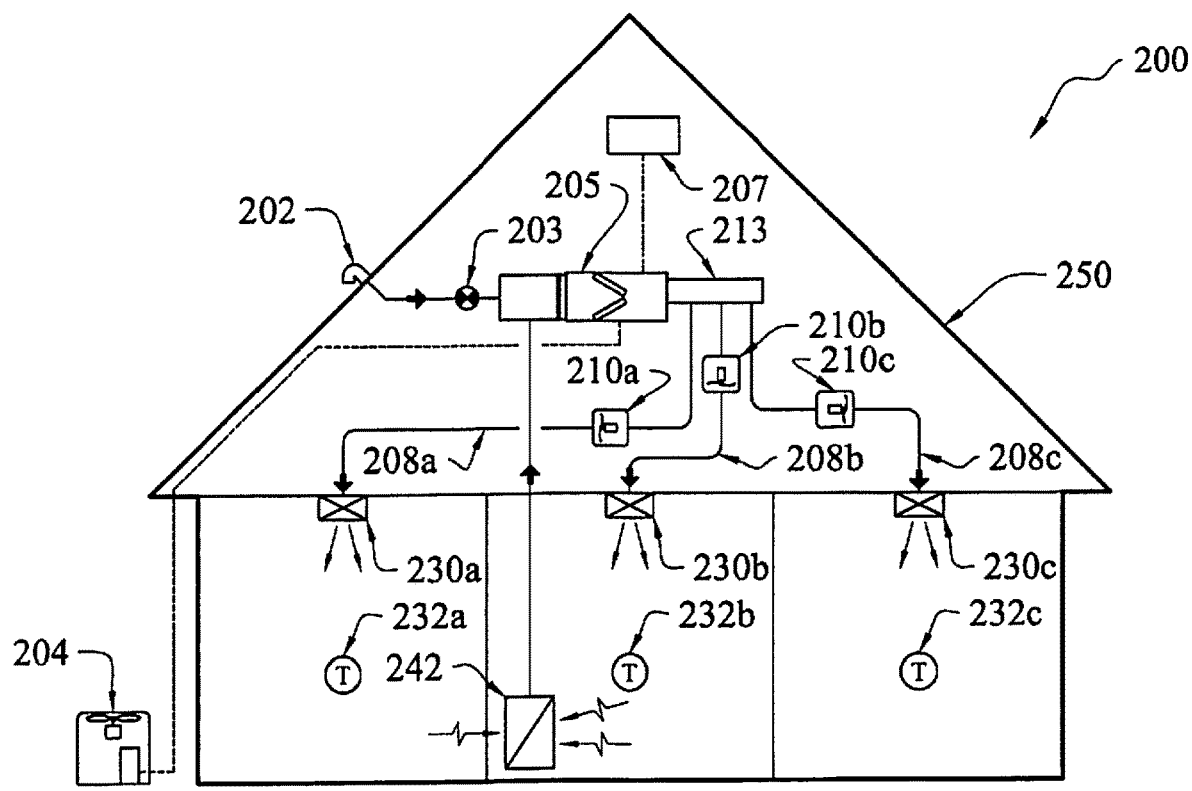
FIG. 4 is a schematic diagram of the variable air flow heating and air conditioning system shown in FIG. 3, as used in a structure.
Figure 5:
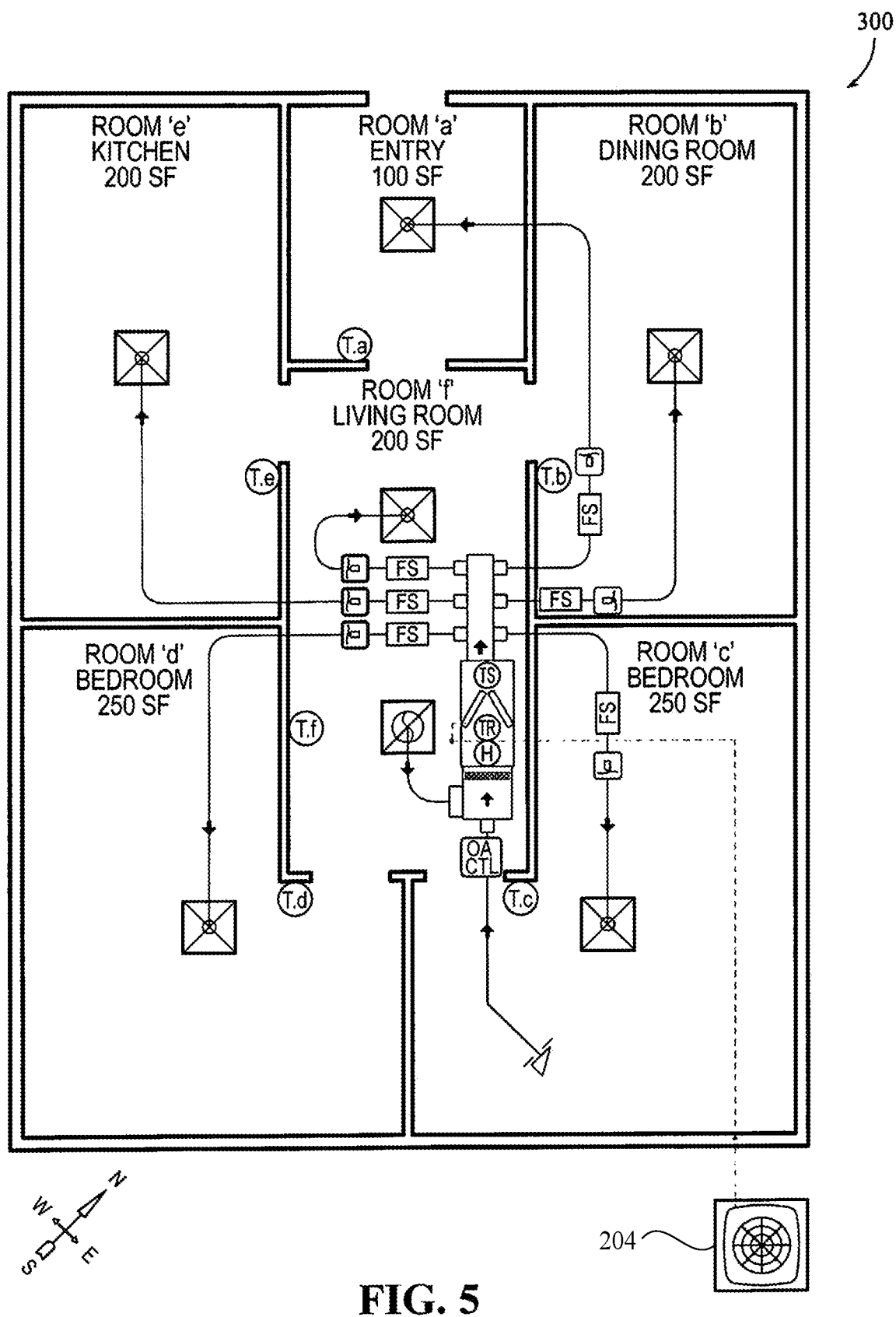
FIG. 5 is a plan view of a schematic diagram of a variable air flow heating and air conditioning system according to another example embodiment of the present invention, showing the system used in a structure such as a residential home.
Figure 6:
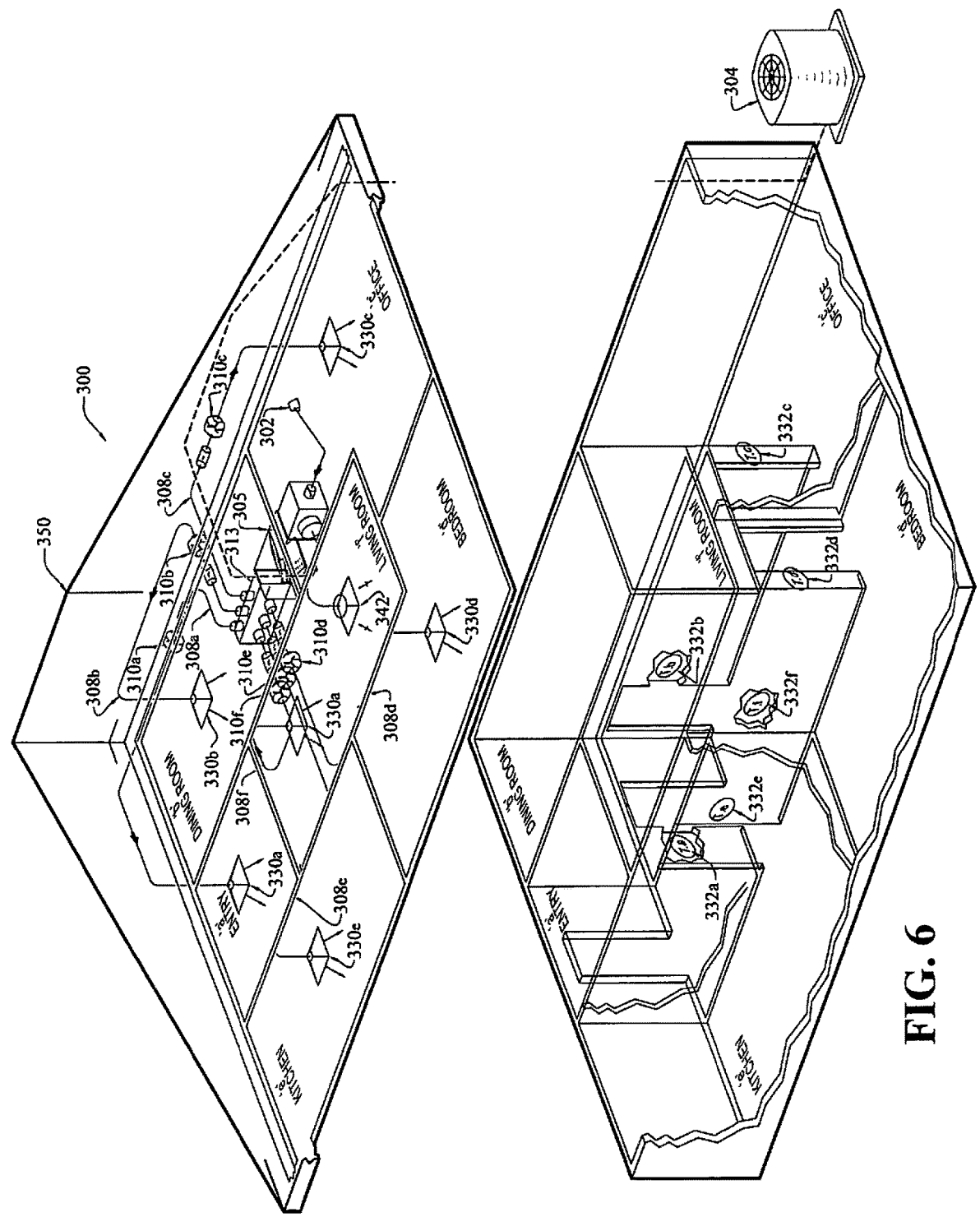
FIG. 6 is a detailed isometric view of the variable air flow heating and air conditioning system of FIG. 5.
Figure 7:
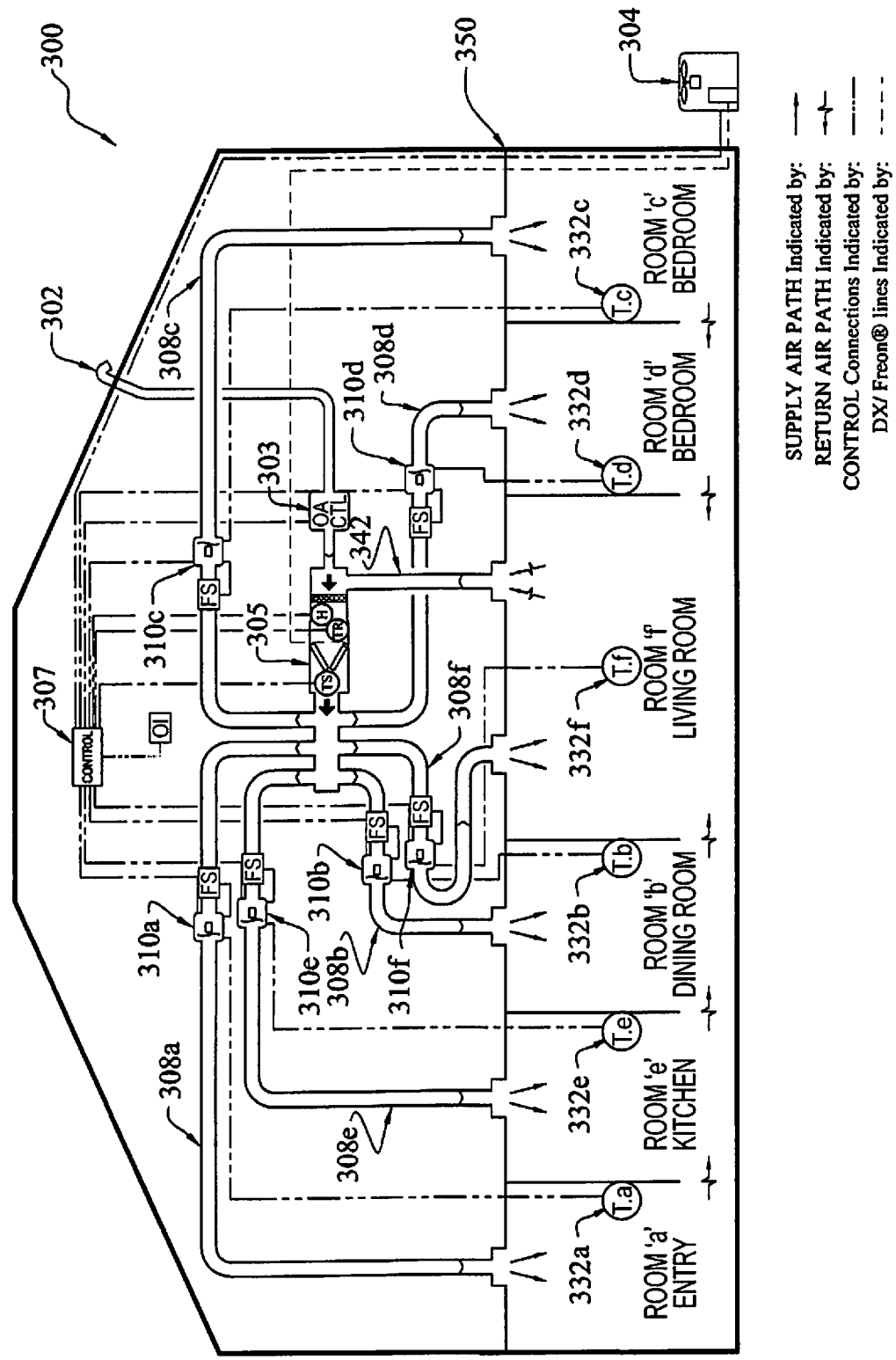
FIG. 7 is a schematic diagram of the variable air flow heating and air conditioning system of FIG. 5.
Figure 8:
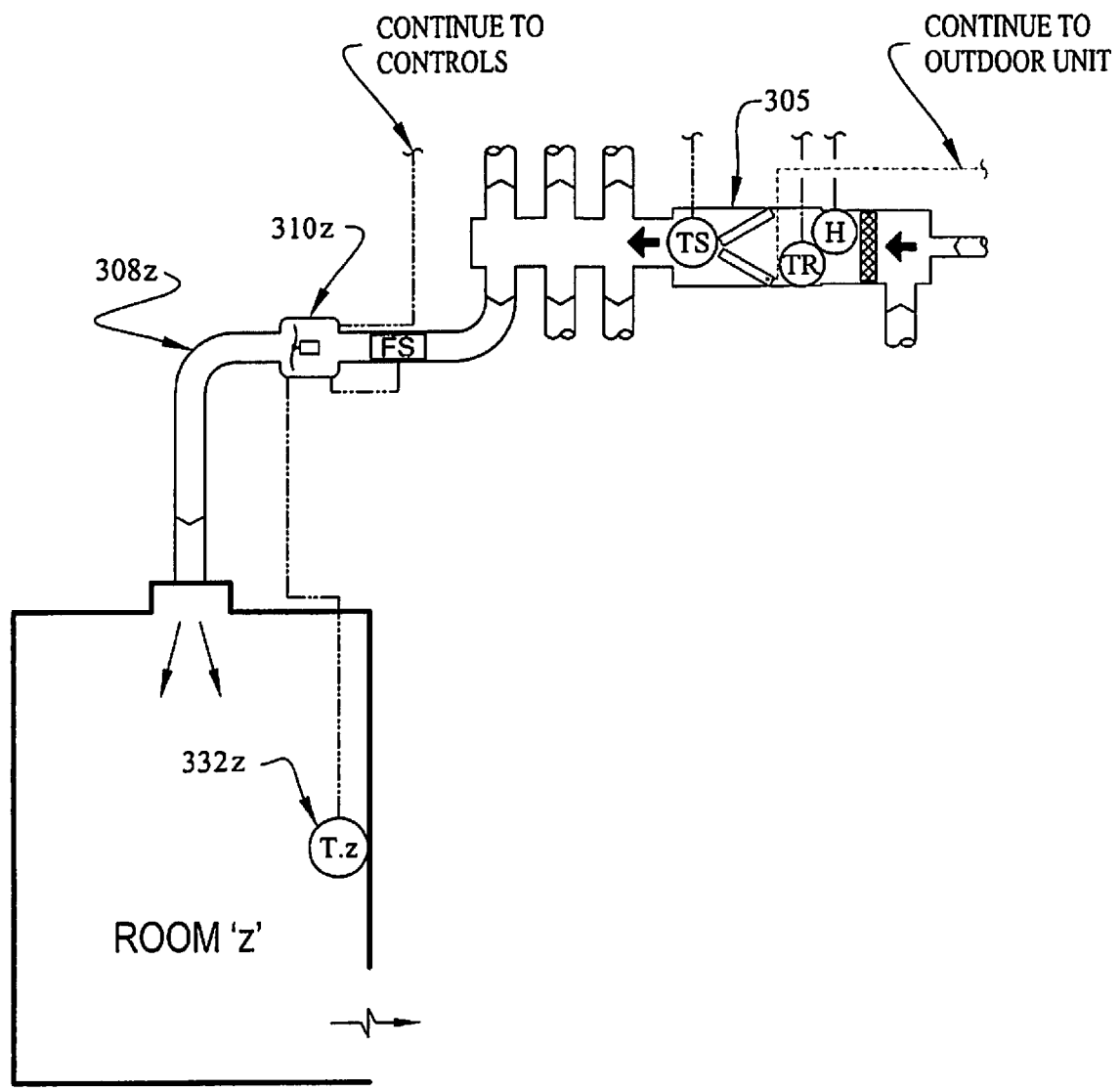
FIG. 8 is a detailed schematic diagram showing only a single zone of the system of FIG. 5.

An example VAF system 200 is illustrated in FIGS. 3 and 4. The VAF system 200 includes an outdoor unit 204 and an indoor heat transfer unit 205 (IHTU). The VAF system 200 can include a ventilation fan 203 drawing air from an outside air intake 202 and directing the outside air toward the IHTU 205. The ventilation fan 203 can have variable speed control, can measure air volume and can include $CO_2$ instrumentation and can form a part of an energy recovery scheme.

The VAF system 200 can connect the outdoor unit 204 to the IHTU 205 through at least one heat transfer fluid (typically Freon, water, glycol, etc.) transferred by piping line 211. The outdoor unit 204 can include a condensing unit and/or a heat pump, as well as a thermostat control.

The IHTU 205 can include a heating-and-cooling coil and a filter (not shown). The IHTU 205 does not include a fan.

The VAF system 200 is divided into separate remote zones 230a-c, for example three zones as illustrated in the example shown in FIGS. 3 and 4.

Each zone 230a-c has a separately-operable thermostat 232a-c. In use, within the single VAF system 200 and the single IHTU 205, each separate zone 230a-c can use a separate thermostat 232a-c to maintain a different temperature in each zone. Separate air pathways 208a-c, such as ductwork and/or diffusors, connect each zone 230a-c to the IHTU 205. Each supply air pathway 208a-c includes a separate fan 210a-c positioned remote from the IHTU 205 along the air pathway. Each fan 210a-c is activated to draw and direct conditioned air from the IHTU 205 along an air pathway 208a-c to the respective zone 230a-c. The VAF system 200 does not include or use balancing dampers to manage air flow from the IHTU 205.

In use, at least one of the thermostats 232a-c creates demand to adjust the temperature in its respective zone 230a-c. This demand for conditioned air causes one or more of the fans 210a-c to activate to draw conditioned air from the IHTU 205 and direct the conditioned air to the respective zone(s) 230a-c. Conditioned air from the IHTU 205 enters a common plenum (duct) 213 from which it then is drawn to a particular air pathway 208a-c by fans 210a-c as activated by the control system. Each thermostat 232a-c causes one of the fans 210a-c to move a measured volume of conditioned air from the IHTU 205 along one air pathway 208a-c to a respective zone 230a-c. As a result, one zone 230a-c can adjust the temperature set-point independent from adjustments being made for the remaining zones while the remaining zones maintain their temperature in a dynamic and adaptive manner as loads and IHTU capacity varies.

The VAF system 200 can also include at least one return air vent 242 positioned in at least one of the zones 230a-c to return air from the zones along a return air pathway to the IHTU 205 to be re-conditioned.

As particularly shown in FIG. 3, the VAF system 200 includes a central control 207, which communicates sensor inputs, including the temperature adjustment request and temperature reading between the thermostat 232a-c in the zones 230a-c and the fans 210a-c. This information communicated through the central control 207 activates or deactivates dynamically increasing or decreasing the volumetric flow rate of the fans. The central control 207 communicates to the fans 210a-c and the thermostats 232a-c through electronic connection, wired or wireless, and can provide power to the fans. The central control 207 also performs the functions of a thermostat in the operational control of the outdoor unit 204 and IHTU 205, which is either in a heating mode or cooling mode. Transitioning from a heating or cooling mode can be determined in controls via a zone voting scheme, as used in some commonly offered VAV systems. The VAF system is not intended to function to provide for simultaneous heating and cooling in different zones. The VAF system functions to optimize the degree of control to each zone as demanded by the thermal loads of individual zones to better decouple the thermal load from the supply capacity of conditioned air provided by the outdoor unit 204 and IHTU 205. The central control 207 can also communicate with an outside air system in any of the schemes previously described and can incorporate input from sensors for humidity, $CO_2$, air quality providing power and control through electronic connection, wired or wireless. The central control 207 can also communicate with the outdoor unit 204 to activate or deactivate, and provide power through electronic connection, wired or wireless. The central control 207 can be in electronic communication with an operator interface 206, which allows a user to enter information such as set-points, schedules and priorities for the use of the VAF system 200.

The above disclosed system is illustrated, in FIG. 4 in particular, to be used in a house-like structure 250, but can be applicable to mobile as well as stationary installation., i.e. not just residential/commercial but also automotive (cars, buses, etc.), boats/ships, aircraft, etc. The described system can also provide diagnostic and analytic control, incorporating automated commissioning and advanced features which are not normally included in smaller systems.

FIGS. 5-11 show a VAF system 300 according to another example embodiment of the present invention. As depicted, the VAF system 300 is intended to be used in a house-like structure 350 according to at least one example embodiment of the present invention. According to other example embodiments, the VAF system 300 can be provided for HVAC systems installed in residential homes, multi-family housing, hotels, commercial structures, motor homes, any domicile space, recreational vehicles, vessels, aircraft or other structures comprising multiple zones or spaces to be provided with air conditioning.

According to one example embodiment, the system 300 is generally a split system, for example, comprising a heat pump consisting of an indoor cased coil and an outdoor condensing unit 304 that are connected by a direct expansion (DX) refrigerant loop. All indoor air movement within the structure 350 is provided by the systems and components as described herein. Optionally, according to other example embodiments, the system 300 as described herein can preferably be applied and retrofitted with various other heating and/or cooling systems.

According to one example embodiment, an outdoor air intake component 302 (typically a wall cap, roof cap or intake louver) can be provided. According to one example embodiment, an outdoor air control unit can be provided and in communication with the outdoor air intake component 302. According to example embodiments, the outdoor air control unit 303 may be a simple motor-operated damper, a supply fan, or an energy recovery ventilator (ERV). According to one example embodiment as described above, an outdoor unit 304 can be provided, for example, so as to provide functionality to the heat pump or air conditioning. According to one example embodiment, the outdoor unit 304 can comprise a compressor, a reversing valve, a heat rejection fan and a coil for either heat pump or air conditioning. In example embodiments, the outdoor unit 304 is normally operated by a single thermostat in the indoor controlled space. However, according to example embodiments of the present invention, any and all functions, signals, etc. that a thermostat may provide to the compressor and/or the ITHU 305 are controlled by a central controller 307 (as will be described below).

According to the depicted example embodiment, the ITHU 305 is simply a cased coil. For example, typical prior art ITHU systems including an air handler with a fan, however, all air movement of the system 300 are operated by zone fans 310 (as will be described below), and thus, much more variability of the air flows can be provided to a desired zone of the structure 350. For example, according to one example embodiment, the structure 350 comprises multiple rooms (a-f) designating a zone for each of the rooms. For example, as depicted in the first chart of FIG. 11, each of the rooms (a-f) corresponds with a particular room of the structure 350. Accordingly, each zone (a-f) comprises its own separate fan 310 and air duct 308, conduit or other hose or medium by which air may be directed and carried a distance to a desired space/zone.

In example embodiments, a common supply plenum or other desired duct or conduit 313 for collecting the air leaving the ITHU 305, for example, which is further in communication with the air ducts 308a-f of each zone. As such, the plenum 313 provides an intermediate collection/transfer area where conditioned air is freely drawn (via the corresponding fan 310a-f) to each of the air ducts 308a-f that are demanding conditioned air. In normal operation, the plenum 313 allows for the single flow of conditioned air to be split according to the number of zones the system intends to serve. According to one example embodiment, the plenum 313 comprises one input from the ITHU 305 and six output channels or conduits (or air ducts 308a-f) such that multiple smaller flows of the conditioned air are drawn from the plenum 313, through each respective air duct 308a-f, passing by respective fans 310 a-f, and further being discharged from a vent or register 330a-f that is provided within each of the respective zones (a-f).

According to example embodiments and as will be described in greater detail below, a central control 307 is provided and configured to continuously process data (e.g., temperature, humidity, $CO_2$, air quality, occupancy, or others as described above) obtained from one or more zone sensors 332a-f that are generally positioned along a wall (or other desired location) of the zone (a-f) it is intending to serve, for example, and conduct one or more real-time calculations with the data obtained from the one or more zone sensors 332a-f so that real-time adjustments can be made for each fan 310a-f (e.g., the fan speed) so as to meet the load of the respective zone (a-f) while maintaining a desired net air flow through the heat transfer element of the air conditioning system (within the specific range of operation).

According to example embodiments, the central control 307 comprises a separate operator interface (OI), for example, which can be a hard-wired device, a remote-connected device (e.g., smart device, tablet, electronic device, PC, computer, laptop, etc.) connected wirelessly (e.g., internet, WiFi, Bluetooth®, IR, radio, based in the Cloud or server, other wireless technology, etc.).

In example embodiments, the fans 310a-f are preferably capable of moving air, for example, by rotation of at least one propeller or fan blade. In example embodiments, the fans 310a-f are powered by a hard-wired connection, for example, and are further connected (wired or wireless) and in communication with the central control 307. Preferably, the fans 310a-f are capable of varying their rotation or speed (e.g., and the air flow thereof) so as to provide a desired air flow of conditioned air to each respective zone based on the respective load thereof. In example embodiments, the variable speed fans 310a-f are configured to draw a measured volume of conditioned air through the plenum 313 and direct it to the zones (a-f) based upon what the central control 307 directs them to do. According to example embodiments, each fan 310a-f comprises a flow measuring sensor incorporated therewith, and thus, is capable measuring the air flow entering and/or exiting the fan 310a-f. According to other example embodiments, separate flow measuring sensors can be incorporated with the fan 310a-f and/or the conduit or duct 308a-f that houses the fan 310a-f therein.

According to example embodiments, the system 300 can further comprise a return 342, for example, which comprises at least a conduit or duct to transfer air from the conditioned space back to the IHTU. According to the depicted example embodiment, a single conduit and intake is depicted. Optionally, multiple returns or intakes can be provided, for example, such that a return can be provided for each zone or room of the air conditioned space.

Figure 9:
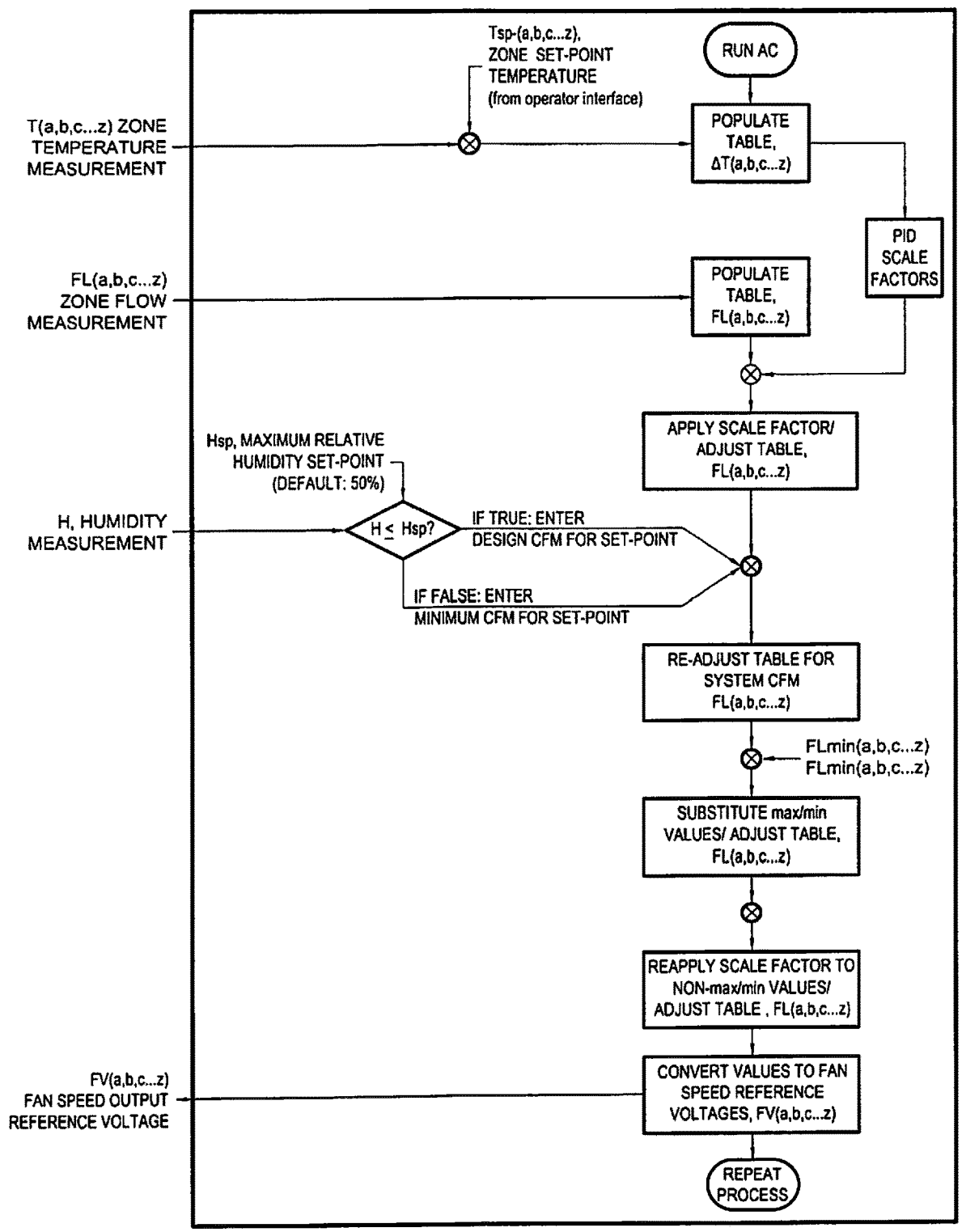
FIG. 9 is a flowchart showing the order of operations of the system of FIG. 5 according to an example embodiment of the present invention.

FIGS. 9-11 show the system of operations of the system 300 and several working examples according to example embodiments of the present invention. For example, as depicted in chart 370 of FIG. 11, the system 300 according to one example embodiment is configured for heating and cooling the house-like structure 350, for example, which comprises six zones (a-f) including an entry room, dining room, office, bedroom, living room and kitchen. According to one example embodiment, the system 300 comprises a design CFM (cubic feet per meter), for example, a calculated optimal scheme based upon the number of zones, space to be heated or cooled and specifications and optimal working ranges of the IHTU, which is set at 1,200 CFM. Furthermore, the system 300 can further include maximum and minimum CFM values corresponding to each of the zones (a-f), for example, which can influence the adjustments (if any) made to the speed of each respective fan 310$a$-$f$ so as to provide conditioned air to each respective zone while maintaining a desired net air flow through the heat transfer element of the air conditioning system (and within the specific range of operation). For example, as depicted in FIG. 10 according to one example embodiment, the system 300 has a nominal capacity of 3 tons, a design CFM of 1,200, a minimum CFM of 1,050, a maximum CFM of 1,350, and multiple other parameters and inputs including a humidity set-point parameter (Hsp), which is set to 50%.

Referring to the flowchart 360 of FIG. 9 and chart 375 of FIG. 11, a first example is shown depicting the system 300 being used for air conditioning without dehumidification. As shown, the system 300 initially begins at a net airflow value (e.g., design CFM) of 1,200 CFM. Then the measured temperature is compared to the target temperature for each of the zones (a-f) to calculate temperature difference values (e.g., $\Delta T$). Next, the temperature difference values are used to influence a proportional integral derivative (PID) controller to determine the extent of the load being demanded by each of the zones (a-f). As depicted, the entry room (zone a) has a measured temperature of 85 degrees F. and a set-point temperature of 75 degrees F. Thus, the calculated $\Delta T$ is 10 degrees and the PID scale factor is 77% (e.g., ($\Delta T \times 100\%$)/sum of each zone's ($\Delta T \times 100\%$)). Typically, simultaneously the air flow is measured, for example, which is measuring the same as the design CFM of 1,200 CFM.

Next, the values obtained from the PID controller are used to calculate a first set of flow adjustments (see first adj column of chart 375). For example, referring to zone a, with the measured flow of 100 CFM, the calculation of the PID controller causes the flow of zone a to increase from 100 CFM to 177 CFM (e.g., increasing the flow by 77%). According to the depicted example, the entry room comprises a scale factor of 100 compared to the sum of each zone's scale factor (e.g., 130). Thus, performing the following calculation, (100/130)×100%=77%, the air flow of 100 CFM is increased by 77%, and thus, the first flow adjustment for zone a provides an increase of 77 CFM to 177 CFM. According to example embodiments, one or more control algorithms, feedback and/or logic loops, or other coding or software can be incorporated with the central control 307 (and/or PID controller thereof) so that the system 300 can continuously monitor the zone(s) it is serving and provide a dynamic and directed response based upon the proportionality of the load(s) being demanded while also maintaining a net air flow through the heat transfer element of the air conditioning system.

In example embodiments, the central control 307 processes the data and calculations are performed for each of the zones (a-f) so that the first set of flow adjustments are complete. Next, the humidity of the air that is being returned to the IHTU 305 is measured, and based upon its value compared to the humidity set-point value Hsp, the sum of the zone's air flows is adjusted to a preset air flow parameter value for a second set of flow adjustments (see second adj column of chart 375 of FIG. 11. As shown in FIG. 9, if the measured humidity H is less than or equal to 50%, the design set-point CFM is used as the sum of the second set of flow adjustments. However, if the measured humidity is greater than the humidity set-point Hsp, then the minimum set-point CFM is used as the sum of the second set of flow adjustments. For example, referring to the second adj column of the chart 375 of FIG. 11, the sum of the zone's (a-f) air flows is set to 1,200 CFM as the measured humidity H was less than the humidity set-point Hsp. Then, by taking the sum of the zone's air flows of the second set of flow adjustments and dividing it by the sum of the zone's air flows of the first set of flow adjustments, a proportional scale factor can be applied to the air flow value of each of the zones (a-f). For example, the second flow adjustment for the entry room (zone a) is 161 CFM (e.g., (1,200/1,315)×177).

Next, after calculating the second set of flow adjustments, further processing of the data is provided so as to substitute some of the values thereof when they are not within the range of acceptable minimum/maximum values (see FLmax & FLmin in FIG. 10). As shown in chart 375, all values remain within the range of minimum/maximum values except for the second flow adjustment for the entry room (e.g., calculated as 161 CFM but maximum is set at 130 CFM). Accordingly, the entry room (zone a) is assigned a final air flow adjustment value of 130 CFM, for example, since the second flow adjustment value exceeded the maximum. For example, if a value exceeds the maximum, the replaced flow adjustment value should correspond to the zone's maximum CFM. Similarly, if the value of the second adjustment is less than the minimum, the replaced flow adjustment value should correspond to the zone's minimum CFM.

Finally, the sum of the second set of flow adjustments is divided by the sum of the second flow adjustment values that were within acceptable ranges, which provides a final scale factor that can be applied to each of the zone's airflow values that were within acceptable ranges. For example, the dining room (zone b) had an air flow value of 182 CFM after the second flow adjustment. Accordingly, as chart 370 indicates that the dining room's FLmin-b, FLmax-b range is between 60-260 CFM, the second flow adjustment value of 182 CFM lies within the range, and thus, gets placed in the column of chart 375 titled "pass-thru values in range". Then, the sum of the second set of flow adjustments (e.g., 1,200 CFM) is divided by the sum of the second flow adjustment values that were within acceptable ranges (e.g., 1,169 CFM) to obtain a final scale factor of 1.0265 (e.g., 1,200/1,169=1.026 or 103%). Thus, with the exception of the entry room flow value exceeding the maximum of 130 CFM, the final flow adjustment values of the other rooms (zones b-f) are scaled according to the new scale factor of 103% to produce a final set of flow adjustments. According to example embodiments, if the value of the volumetric air flow is outside of the minimum/maximum values (e.g., FLmax & FLmin), either the maximum FLmax or minimum FLmin is used to replace the out-of-range value, and the replacement value remains the same for the final set of flow adjustments.

According to an example embodiment and referring back to the dining room of the chart 375, the pass-thru value of 182 is multiplied by the final scale factor of 103% to obtain a final calculated air flow value of 188 CFM. The same is performed for each of the other "pass-thru" values and the final volumetric air flow values can be charted, logged or otherwise presented appropriately within the central control so as to provide one or more speed reference voltages to the corresponding fans. According to example embodiments, speed reference voltages can be generated by the central control and sent to each of the desired fans to initiate rotation of the blade(s) to a speed needed to generate the final calculated volumetric air flow value. Accordingly, as depicted in chart 375 of FIG. 11, zone sensors, flow measuring devices, temperature and humidity sensors, etc. allow for the ability of the system 300 (and central control 307 thereof) to process the data and perform calculations to proportionally scale the individual volumetric air flow values to most effectively, efficiently and economically output conditioned air to the plurality of zones. Furthermore, as disclosed above, the plenum 313 is configured to act as a splitter or temporary housing or pass-by for the ducts 308*a-f*, and thus with the fans 310*a-e* interconnected and in communication with the ducts 308*a-f* (and downstream from the IHTU and coils thereof), the rotation of one or more fan blades in at least one direction causes air to flow therein, and thus, creates a pull or draw effect on the air within the duct 308*a-f*. As similarly described above, preferably the summation of the volumetric air flow values for each of the zones is within the set maximum CFM/minimum CFM values based on the particulars of the tonnage and manufactures suggestions, and thus, the net volumetric air flow passing through the coil of the IHTU (e.g., being drawn therethrough by the plurality of fans 308*a-f* communicating within the ducts 308*a-f*) is maintained within the set or acceptable range.

Thereafter, once the final flow adjustment values are obtained and sent to the fans as reference voltages, the process is repeated (see FIG. 9). Accordingly, for each repetition, the zone temperatures are typically brought closer to their target temperatures, and thus the ΔT for each zone continues to be reduced until each zone is fully satisfied.

According to one example embodiment, the sequence of operations for the VAF system 300 includes steps 0-5 as shown in Operation Outline 1 below. As shown, the steps include: 0) set-up system, pre-program variables, schedules, operator interface 1) start system; 2) measure temperature a. compare to zone temperature set-point; b. calculate zone ΔT; c. generate PID scale factor; 3) increase zone fan speed to set point; a. initial Set point shall be zone design CFM; b. measure zone air flow; c. receive new fan speed reference voltage based on CFM set point; d. call for heating or cooling; 4) run IHTU; a. for majority of zones calling for cooling, enable compressors for AC operation; b. for majority of zones calling for heating, enable heating system; c. verify sufficient flow for heating or cooling operation; d. send new fan speed reference voltage based on CFM set point; 5) repeat process; a. re-evaluate call for heating or cooling; and b. satisfy heating or cooling, disable heating/cooling. Optionally, the process/steps of the sequence of operations of the VAF system 300 can be chosen as desired.

0) Set-up system, Pre-program variables, schedules, Operator Interface
1) Start System
2) Measure temperature
   a. Compare to Zone Temperature Set-point
   b. Calculate zone ΔT
   c. Generate PID scale factor
3) Increase zone fan speed to set point
   a. Initial Set point shall be zone design CFM
   b. Measure zone air flow
   c. Receive new fan speed reference voltage based on CFM set point
   d. Call for heating or cooling
4) Run IHTU
   a. For majority of zones calling for cooling, enable compressors for AC operation
   b. For majority of zones calling for heating, enable heating system
   c. Verify sufficient flow for heating or cooling operation
   d. Send new fan speed reference voltage based on CFM set point
5) Repeat process
   a. Re-evaluate call for heating or cooling
   b. Satisfy heating or cooling, disable heating/cooling Operation Outline 1

According to example embodiments, the central control 307 can continuously monitor and measure the air flows distributed to the individual zones (and the temperatures of the individual zones), which can be quantified and manipulated by the central control on a continuous and dynamic basis. According to example embodiments, the individual zone temperatures are compared to individual set-point temperatures of the same respective zones such that scale factors can be created by using classical temperature control algorithms utilizing standard proportional, integral and derivative (PID) techniques. According to example embodiments, the PID scale factors are applied to the zone's individual air flows so as to adjust the same, and for example, the individual air flows are summed together to establish a new air flow sum. According to example embodiments, the individual air flow values are recalculated on a proportional basis such that the individual air flow values add to a sum equal to a predetermined net air flow value. According to some example embodiments, maximum and minimum air flow values are predetermined and fixed, and wherein individual flow values outside of the range of values between the minimum and maximum air flow values are replaced with the closer of the maximum or minimum air flow value. According to example embodiments, the individual air flow values that remain within the range of predetermined maximum and minimum air flow values are adjusted on a prorated basis so that the remaining total sum of air flows equals the prescribed total air flow. According to example embodiments, the final air flow values calculated by the control system are converted to reference voltage signals and applied (e.g. sent or otherwise communicated therewith) to the individual fans 308*a-f* directing air to the individual control zones in a continuously repeated process to operate an air conditioner.

FIG. 11 shows two other working examples including an air conditioning example with dehumidification (see chart 380) and a heating example (see chart 385). In example embodiments, the process identified in the flowchart of FIG. 9 is repeated for the examples of charts 380, 385. As noted in chart 380, since there is air conditioning with dehumidification, the total flow set-point is 1,050 CFM (for measured humidity above 50%). In example embodiments, working examples of charts 380, 385 are processed similarly and go through a first flow adjustment, a second flow adjustment, an air flow substitution/pass-thru process, and a final flow adjustment.

Figure 12:
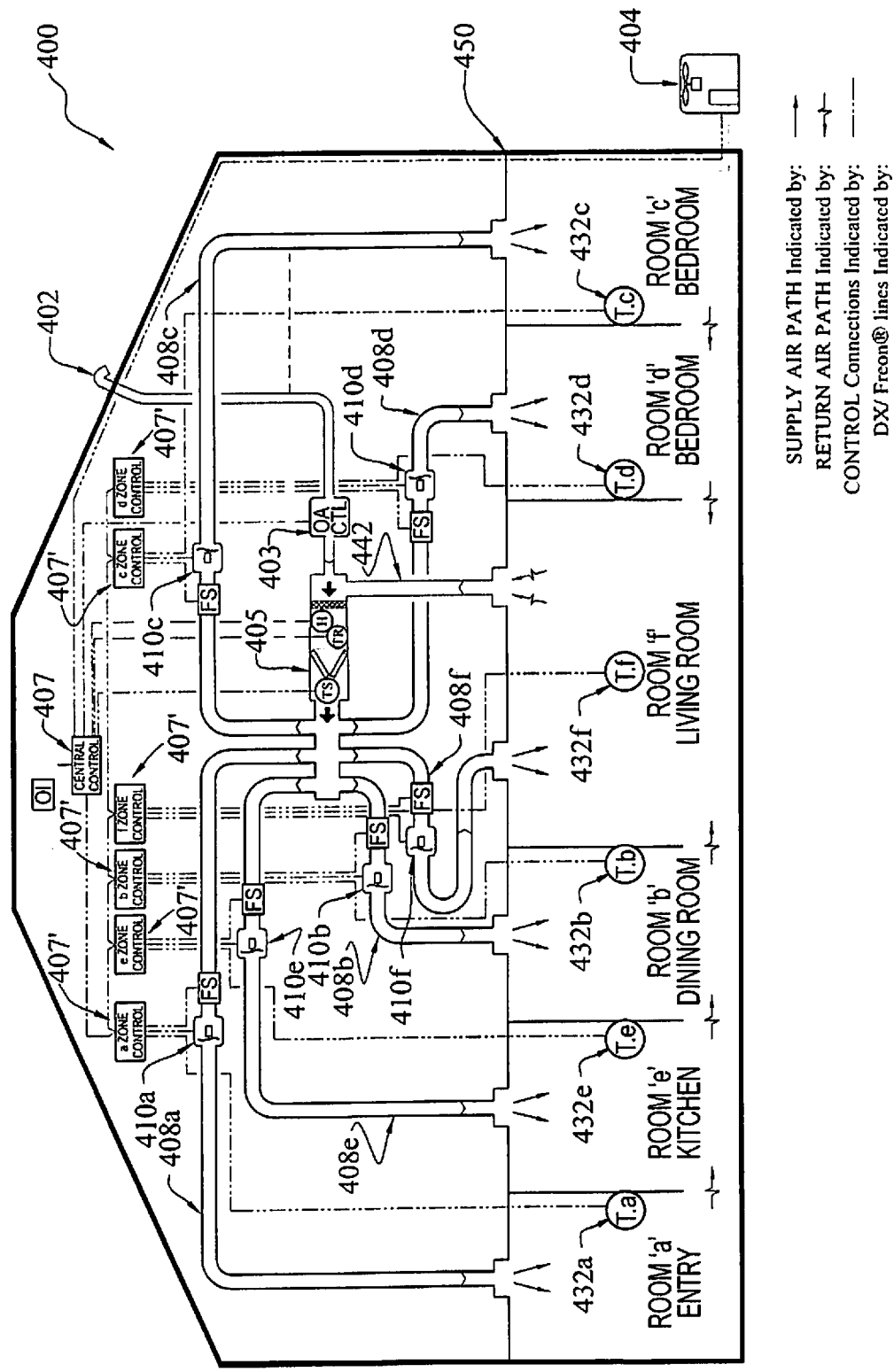
FIG. 12 is a schematic diagram of a variable air flow heating and air conditioning system according to another example embodiment of the present invention.
Figure 13:
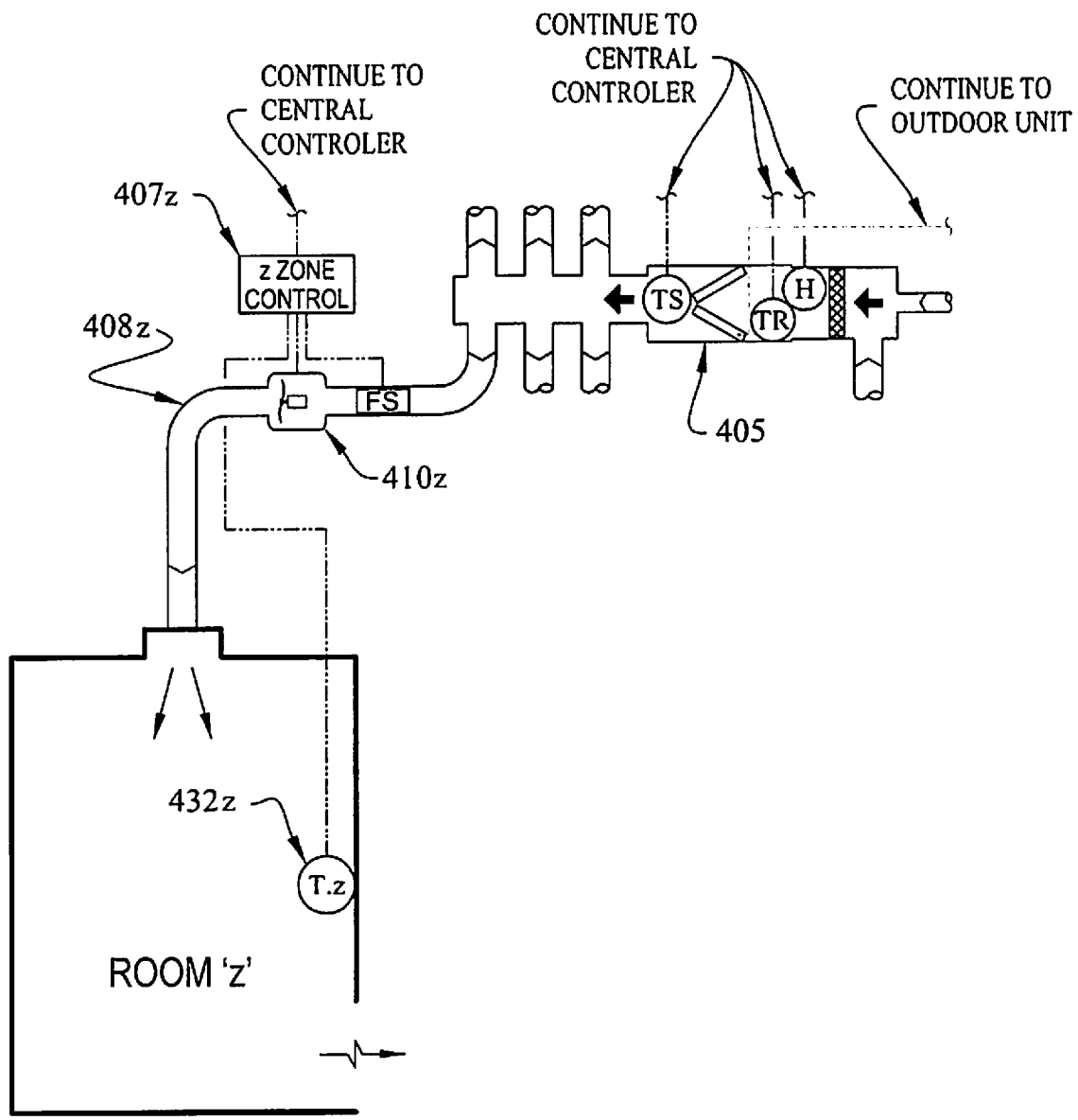
FIG. 13 is a detailed schematic diagram showing only a single zone of the system of FIG. 12.

FIGS. 12-13 show a VAF system 400 according to another example embodiment of the present invention. is intended to be used in a house-like structure 450 according to at least one example embodiment of the present invention. According to other example embodiments, the VAF system 400 can be provided for HVAC systems installed in residential homes, multi-family housing, hotels, commercial structures, motor homes, any domicile space, recreational vehicles, vessels, aircraft or other structures comprising multiple zones or spaces to be provided with air conditioning. According to one example embodiment, the VAF system 400 includes an outdoor unit 404 so as to provide functionality to the heat pump or air conditioning. According to example embodiments, the VAF system 400 is substantially similar to the VAF system 300 as described above. For example, according to example embodiments, the VAF system 400 comprises the components of the VAF system 300 in addition to individual zone controllers that are connected between the central control 407 and the respective components of the individual zones (e.g., fan 408a-f, zone sensor 432a-f, and flow sensor (see FS)). Thus, the VAF system 400 comprises a distributed control system compared to the central control system of the above-described VAF system 300.

According to example embodiments, a zone controller 407' is provided for each zone and communicating with the central control 407 through a data bus using standard communication protocol, for example, such as BACnet, LON or Modbus. As such, the individual zone controllers act as an intermediary between the zone it is intending to serve and the central control 407. According to example embodiments, the individual zone controllers can monitor, collect, send, process data and/or make any desired calculations as needed, for example, in addition to the central control connected therewith. In example embodiments, with each zone comprising its own controller 407', the entirety of the system's 400 control system is more practically implemented, and thus, conditioned air can be efficiently and effectively distributed to the appropriate zones to satisfy any loads while also ensuring that the net volumetric air flow over the coil of the IHTU 405 remains within a fixed volumetric rate predetermined by the system's thermal capacity and user performance goals. Optionally, the central control can be configured so as to maintain the net volumetric flow within a range of the fixed volumetric rate (e.g., between 1,050 and 1,350 according to the examples of FIG. 10). For example, according to one example embodiment, a performance goal to be set by the user could include an adjustable "power on" or "start system" trigger within the "user-adjustable settings" of the control system such that the system would start according to the percentage of zones requesting air conditioning. For example, an "energy efficient" system setting may be where the system would not start until there was a demand of about 75% of the zones. According to other example embodiments, the system can be configured such that the system would initiate or start even if so little as one zone requested air conditioning. According to another example embodiment, the control system could be configured such that 100% of the zones must request air conditioning before the system powers on and begins.

The controls for the VAF system and also the controls found in other 'smart' thermostats (such as Nest®, Ecobee®, and others) can be provided and could be enabled to communicate load and location information to a central processing system for purposes of aggregating the data and processing it for presentation in a novel manner. According to example embodiments, data which may be used for processing and presenting includes the location of the structure comprising the VAF system (city, state, county, zip code, etc.), the cooling or heating load (in use per established time increment), which can be calculated from the product of percent run time and listed capacities, or for example, could factor in percent load for variable capacity compressors. Other relevant information or data that could be provided includes the differentiation between commercial and residential occupancies.

According to example embodiments, the information can be stored and processed as meta-data. It can be used to create near-real-time maps displaying constant load and also a neutral line indicating where the heating and cooling capacities are equal. It is envisioned that this would be similar to a weather map with the purpose of informing professional and academic interests as well as general curiosity for anyone wanting additional awareness of heating and cooling demands. The presentation of this data can be provided in multiple ways. According to one example, the presentation of data includes lines of constant percent usage for cooling, a neutral line and percent usage for heating. According to some example embodiments, the data can be presented similarly to isotherm lines on a weather map. According to another example embodiment, lines of total capacity for cooling and heating can be provided, for example, similar to rain fall totals on a weather map. According to example embodiments, more dense areas would indicate higher totals similar to flood events on a weather map.

According to one example embodiment, the sequence of operations for the VAF system 400 includes steps 0-3 as shown in Operation Outline 2 below. As shown, the steps include: 0) set-up system; pre-program variables, schedules, operator interface; 1) start system; a. central control i. polls zone controllers; ii. evaluate call for cooling and heating; iii. for majority of zones calling for cooling, enable compressors for AC operation; iv. for majority of zones calling for heating, enable heating system; v. receive airflow CFM information from each zone; vi. sum (add) all zone airflows (CFM) together and verify required airflow for heating or cooling; vii. calculate fan speed correction factor; viii. send fan speed correction factor to zone controllers based on system CFM set point; ix. receive zone reference only signals from zone controller; x. send system control information to zone controllers; 1. occupied, standby, unoccupied; 2. system mode heating/cooling; 3. zone set point for standby, unoccupied modes and when zone local set-point is disabled; b. zone Control i. measure zone temperature 1. compare to zone temperature set-point; 2. calculate zone ΔT; 3. generate PID scale factor; 4. add+fan speed correction multiplier sent from central controller to PID loop output; 5. send fan speed reference voltage to zone fan; 6. send demand signals to central control a. call for cooling or heating; b. zone airflow CFM; 7. send only reference signals to central controller; a. zone temp; b. zone set-point; ii. start fan (follow ramp-up preset rate at start-up) 1. initial set point shall be zone design CFM; 2. measure zone air flow; 3. receive new fan speed reference voltage based on CFM set point; 2) repeat process; a. re-evaluate call for heating or cooling; and b. satisfy heating or cooling, disable heating/cooling. Optionally, the process/steps of the sequence of operations of the VAF system 400 can be chosen as desired.

0) Set-up system, Pre-program variables, schedules, Operator Interface
    1) Start System
        a. Central Control
            i. polls zone controllers ii. Evaluate call for cooling and heating
iii. For majority of zones calling for cooling, enable compressors for AC operation
iv. For majority of zones calling for heating, enable heating system
v. Receive airflow CFM information from each zone
vi. Sum (add) all Zone airflows (CFM) together and verify required airflow for heating or cooling
vii. Calculate fan speed correction factor
viii. Send fan speed correction factor to zone controllers based on system CFM set point
ix. Receive zone reference only signals from zone controller
x. Send system control information to zone controllers
 1. Occupied, standby, Unoccupied
 2. System mode heating/cooling
 3. Zone set point for standby, unoccupied modes and when zone local setpoint is disabled
b. Zone Control
 i. Measure zone temperature
  1. Compare to Zone Temperature Set-point
  2. Calculate zone ΔT
  3. Generate PID scale factor
  4. Add+fan speed correction multiplier sent from central controller to PID loop output.
  5. Send fan speed reference voltage to zone fan.
  6. Send demand signals to Central Control
   a. Call for cooling or heating
   b. Zone airflow CFM
  7. Send reference only signals to central controller
   a. Zone Temp
   b. Zone setpoint
 ii. Start Fan (follow ramp-up preset rate at start-up)
  1. Initial Set point shall be zone design CFM
  2. Measure zone air flow
  3. Receive new fan speed reference voltage based on CFM setpoint
2) Repeat process
 a. Re-evaluate call for heating or cooling
 b. Satisfy heating or cooling, disable heating/cooling Operation Outline 2

According to another example embodiment, the present invention relates to a method of efficiently and effectively cooling or heating a structure having at least two zones. According to one example embodiment, the structure includes an outdoor compressor, an indoor heat transfer unit and heat pump. Ducts are connected between the indoor heat transfer unit and the zones. The indoor heat transfer unit lacks a central fan and individual fans are placed within the ducts (or positioned to be in communication with the ducts) to draw air from the indoor heat transfer unit (and across the coil) to the desired zone at the desired rate, for example, so long as the sum of the net volumetric air flow remains within a net volumetric air flow range (or for example, remains at a preset volumetric air flow rate lying within the range). According to example embodiments, the method includes including drawing air across the heat transfer coil of the indoor heat transfer unit within the net volumetric air flow range (or preset volumetric air flow rate); measuring individual air flows of the at least two zones within at least a portion of the ducts such that air flow signals generated by the measuring thereof are sent to a control system for processing; summing the individual zone air flow signals in the control system to generate an instantaneous net volumetric air flow rate for the entire air volume moving across the coil of the indoor heat transfer unit; comparing the measured net volumetric air flow rate to the preset volumetric air flow rate to adjust it proportionally to maintain the instantaneous net air flow at the preset volume as if there was a single fan operating the system.

Optionally, according to other example embodiments, the method as described herein, and the systems, components, etc. can be equally applied to packaged-type HVAC systems. Indeed, split systems such as the above-described examples comprising an outdoor compressor and an indoor heat transfer unit and the heat transfer coils thereof are excellent candidates for the systems 200-400 as described herein. However, other HVAC systems such as packaged air conditioning units can similarly be converted or newly built so as to provide seamless operability with the systems as described herein. According to one example embodiment, in a similar manner, the fan is removed from the packaged unit and a common supply plenum is connected to communicate within the indoor heat transfer unit and coils of the packaged unit. Ducts are provided for extending from the supply plenum to two or more zones. The speed or rotation of at least one fan positioned within each duct causes conditioned air to be drawn across the heat transfer coils, through the supply plenum and further along the ducts until being output into the respective zone. In a similar manner, the packaged unit can comprise a central control or can comprise a distributed control system, both of which are described in greater detail above. According to yet other example embodiment, various other heating and cooling equipment can be configured to operate with the systems as described herein.

In other embodiments, dynamic setpoints may be used to continuously and automatically update or change preprogrammed setpoints upon the occurrence of a time and/or event. When a setpoint is updated, the VAF system may change, for example, the fan speed for one or more areas according to the control scheme previously described using the new setpoints within the calculation.

The dynamic setpoints may be changed according to, for example, user occupancy, user hierarchy, time of day, user location, user schedule, and combinations thereof. They may also be changed according to other events or times not listed here.

In example embodiments, the temperature setpoint for a given room may be dynamically updated based on the presence of a user within the room. In some examples, a sensor determines that a user has entered a given room, such as dining room b, and sends a signal to the zone sensor 432b and/or the central control 207. The system may then update the current temperature setpoint to a different setpoint. For example, in a cooling mode, the temperature setpoint may be updated from a higher temperature to a lower upon entry of a person into the zone. In some example embodiments, the system may increase or decrease the temperature set point for a zone based upon the exit of a person from a zone.

In particular embodiments, when a user enters a particular zone, the set points of other zones may be updated in response. For example, if the user enters a zone corresponding to a home office (zone c), the setpoints of other zones may be changed in anticipation of their expected vacancy while the user is within the zone corresponding to the home office. Further, if the home office zone is located on the second floor, the setpoints of the zones on the first floor may be updated to reduce their expected demand, while the zones on the second floor may be updated to provide quicker and/or more efficient heating or cooling around the home office zone.

The VAF system may also dynamically switch between temperature setpoints based on the users. In one example, the system may switch between setpoints based the preferences or programmed setpoints of a designated user. For example, user Alpha may have a temperature setpoint X, while user Beta may have a temperature setpoint Y. When Alpha enters a particular zone, the corresponding temperature setpoint may update to temperature X. When Beta enters a particular zone, the temperature setpoint may update to temperature Y. The system may also employ a list such that setpoint determinations are based on the preferences or setpoints of the highest ranking user on said list currently present within the VAF system. In particular embodiments, if user Alpha and Beta enter the same room, and user Alpha ranks higher on the list than user Beta, the system may update its setpoint to user Alpha's preferred setpoint. The system may also make set point determinations based on when a user enters a room. For example, if user Alpha enters dining room (zone d) before user Beta, the system may update its setpoint to user Alpha's preferred setpoint.

In other embodiments, the temperature setpoint may be adjusted based on the amount of time a user is present within and/or absent from a room. In example embodiments, the temperature setpoint may update upon a person's continuous presence within a room for at least five minutes. In some embodiments, the temperature setpoint may change when a person has been absent from a room for at least five minutes. In such embodiments, the system may prevent unnecessary changes in setpoints due to brief excursions into other zones, saving energy by avoiding unnecessarily changing the speed of the corresponding fans.

According to other examples, the setpoints may dynamically update based on a schedule. For example, when the system is in cooling mode, the temperature setpoint for a zone corresponding to a bedroom (zone d) may switch from a higher setpoint to a lower setpoint around a user's bedtime in order to condition the room for comfortable sleeping, while not placing an unnecessary demand on the system beforehand.

A variety of different sensors, systems, devices, and/or electronics may be used to dynamically update the setpoints. Some example occupancy sensors include motion detectors, wearable devices such as smart watches, portable devices such as smartphones, smart home devices such as thermostats, and other smart appliances such as smart TVs. The sensors used to dynamically update the setpoints may be the same as the zone sensors or separate sensors. More than one sensor may be used to update the setpoint. The sensor may also communicate with the zone sensors, the central control, or both to update the setpoints through a wired or wireless connection. For occupancy sensors that are not stationary, occupancy may be determined by geofences, proximity of the sensor to the zone sensors, or any other suitable means.

The VAF system may also dynamically switch between heating and cooling based on the users. In one example, the system may switch between heating and cooling given the preferences or programmed setpoints of a designated user. The system may also employ a list such that heating and cooling determinations are based on the preferences or setpoints of the highest ranking user on said list that is currently present within the VAF system. In other examples, the VAF system switches between heating and cooling based on the preferences of a majority of users or a majority of user setpoints. For example, if a majority of users have setpoints below the current setpoint of a zone or zones, and only a minority of users have a setpoint above the current setpoints, the system may choose cooling mode in order to accommodate the majority. Heating and cooling determinations may also be made based on a schedule.

In addition to dynamically updating the temperature setpoints, the VAF system may also dynamically update other parameters, such as those seen in FIG. 10. For example, the design CFM may be dynamically updated in response to an increase or decrease to a number of users within the zones covered by the VAF system. In this example, if the number of users within a home using the VAF system is four, and one or more sensors detect one or more additional users entering the home, the system may update the design CFM so that the system can more easily compensate for the additional heat from the additional users.

In some embodiments, the VAF system may also prioritize resources to a particular user. For example, given a system in cooling mode and already at its maximum CFM, the system may choose to divert a larger portion of the conditioned air to a particular user in order to better accommodate that user's preferences.

In some embodiments, the VAF system may have multiple vents and fans within a single room. In particular environments, such as a gym, multiple users may be present within a room with multiple zones, each comprising one or more fans. The system may update the temperature setpoint for one or more particular fans based on the preference of a user nearest the one or more particular fans, as determined by the previously mentioned sensors. In this manner, desired heating and cooling may be accomplished for multiple users within a room. If multiple people are near a fan, a setpoint may be determined based on, for example, a hierarchy of users, the order in which the users entered the one or more zones comprising one or more fans per zone, or a voting system based on the preferences of all of the users within the fans zone. Additionally, when a first user's setpoint is being used for a first fan, and a second users setpoint is being used for a second fan that is near and/or adjacent to the first fan, the control system may dynamically update the speed of each fan such that the total effect of the fans is to deliver the desired heating or cooling to each zone, while accounting for any spillover that may occur between the two zones.

For example, in addition to the traditional register(s) provided to meet the aggregate thermal load due to usage and envelope needs of a particular zone (typically a single room as described above), one or more systems of the present invention can be configured for substantially increased VAF outlets within a typical zone to more precisely subdivide that area to meet the unique needs of a particular user's (or set of user's) in a configuration tailored to anticipate the specific occupancy of that user as they inhabit a specific space on a dynamic basis. To increase the effectiveness of this approach, more directionally adjustable registers such as dual deflection or eye-ball supply grilles may be used to direct air flow towards an individual user.

Figure 14:
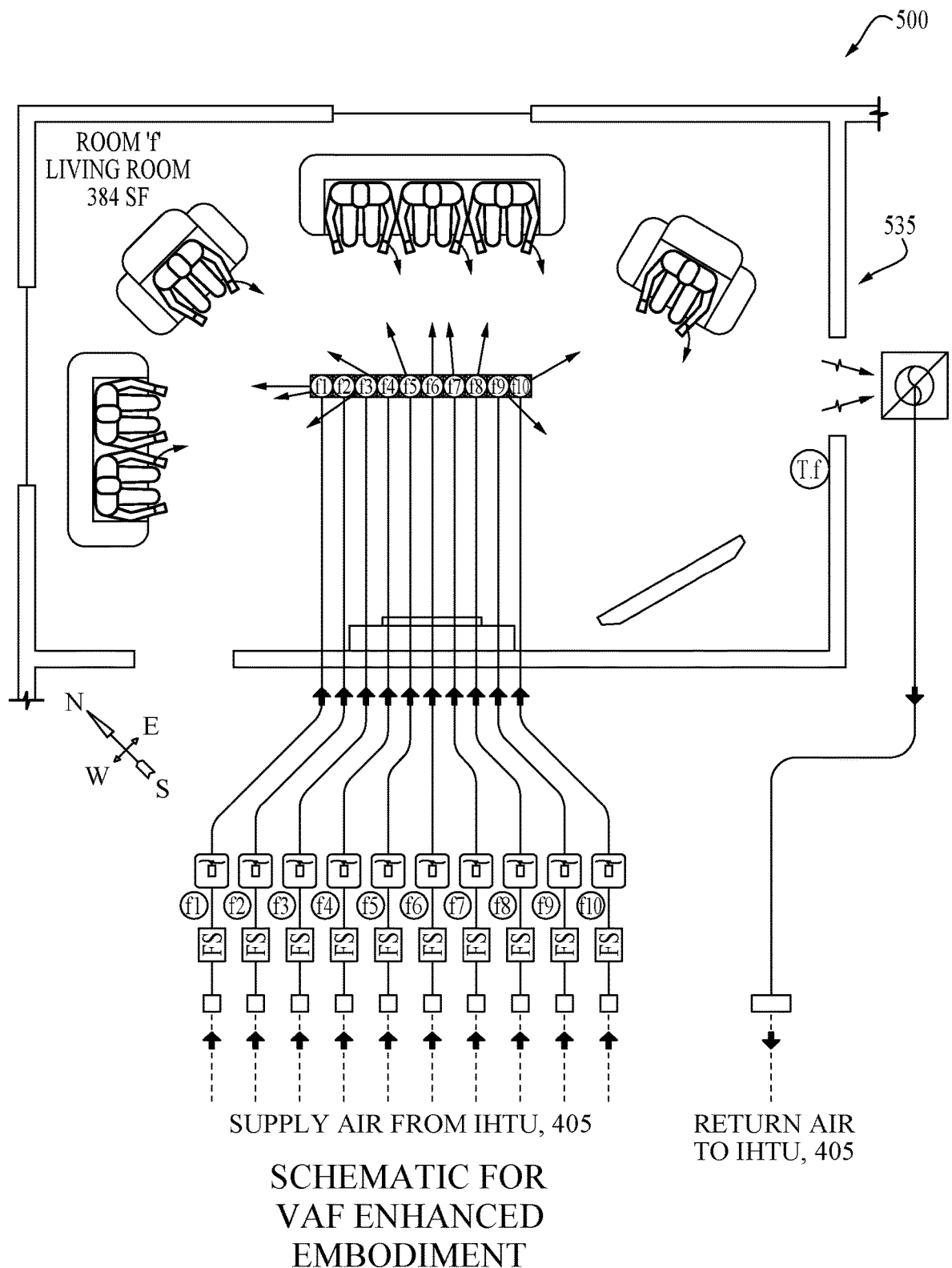
FIG. 14 is a plan view of a partial schematic diagram of an enhanced variable air flow heating and air conditioning system used in a structure such as a living room of a residential home according to another example embodiment of the present invention.

According to additional example embodiments, the present invention comprises an enhanced VAF system 500. For example, as depicted in FIG. 14, the room is a living room in a house 535 and comprises the enhanced VAF system 500, only a portion of which is shown concerning the living room. For example, expanding on the previously described Room 'f' of FIG. 5, the room in this example would be much larger with two exterior walls with windows and would have: a heat producing video device, a fireplace, a long sofa, a love seat and two reclining chairs. Indeed, while only the living room is shown, it is appreciated that the enhanced VAF system 500 would be interconnected throughout the house in the present example. According to a plurality of other example embodiments, the enhanced VAF system 500 can be provided for HVAC systems installed in residential homes, multi-family housing, hotels, commercial structures, motor homes, any domicile space, recreational vehicles, vessels, aircraft or other structures comprising multiple zones or spaces to be provided with air conditioning.

Traditionally, this space of the living room would be served with register placement directing conditioned air at the two windows. The control for this space would be by a thermostat located in dose proximity to the central return intake presumably in another room. Further the traditional constant volume allocation of air would accommodate the maximum occupancy, envelope, and internal loads anticipated for the space.

However, according to an example embodiment of the present invention, a portion of enhanced VAF system 500 is depicted and includes multiple registers with individual controls directed at possible loads as may be required to satisfy their unique demands. In this arrangement a common temperature sensor is placed in the room in the path of the return air flow, but this enhanced embodiment would allow for not yet envisioned means of detecting actual temperature that correspond to the multiple individual zones set points.

Figure 15:
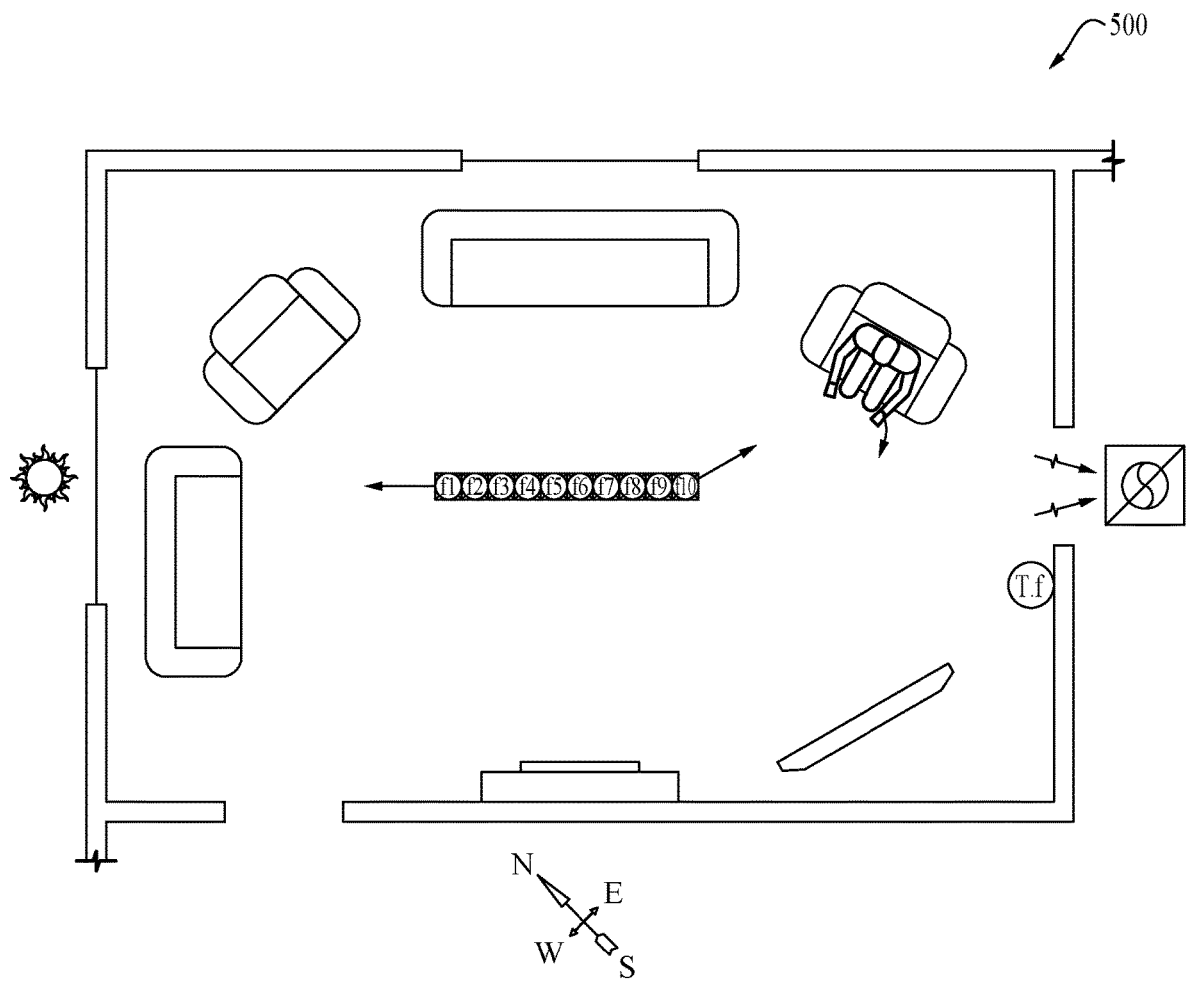
FIGS. 15-18 show examples and scenarios of the enhanced variable air flow heating and air conditioning system of FIG. 14, showing how various heat loads and their location will cause reconfiguration of the conditioned air being delivered to the living room.

For example, as will be described below, FIGS. 15-18 depict multiple examples and scenarios in which the living room portion of the enhanced VAF system 500 undergoes change based upon particular inputs (the numerical zone number corresponding to the same numerical f value—see FIGS. 15-18). For example, as depicted in FIG. 15, zone fan 1 is configured to serve the load for the sunlight on the window and would be activated by following a pre-programmed schedule: all the other zones would be idle except for zone fan 10 which is active in response to the detection of an occupant via a wearable device sitting in a location that capable of being conditioned by zone fan 10.

Figure 16:
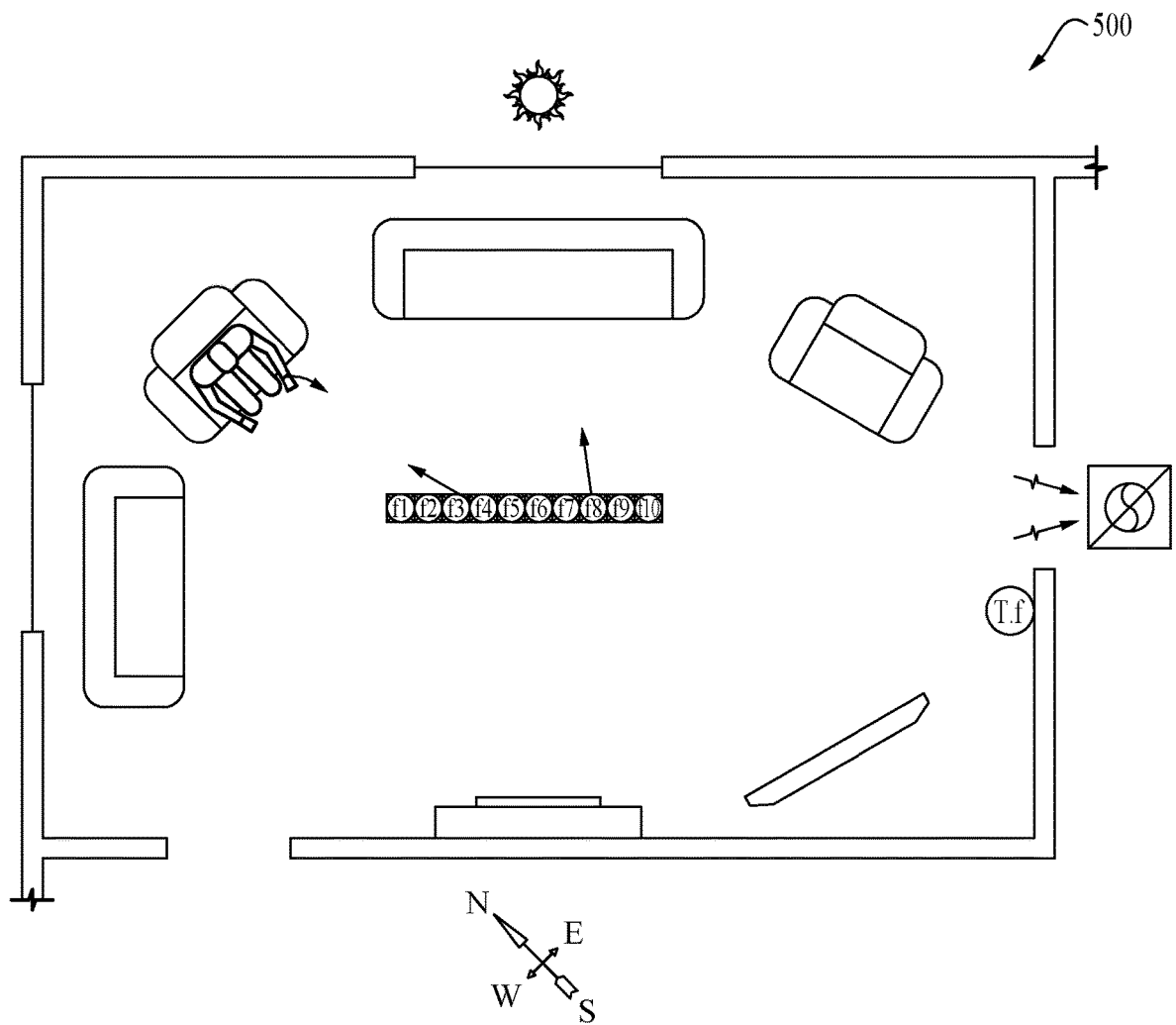
Figure 17:
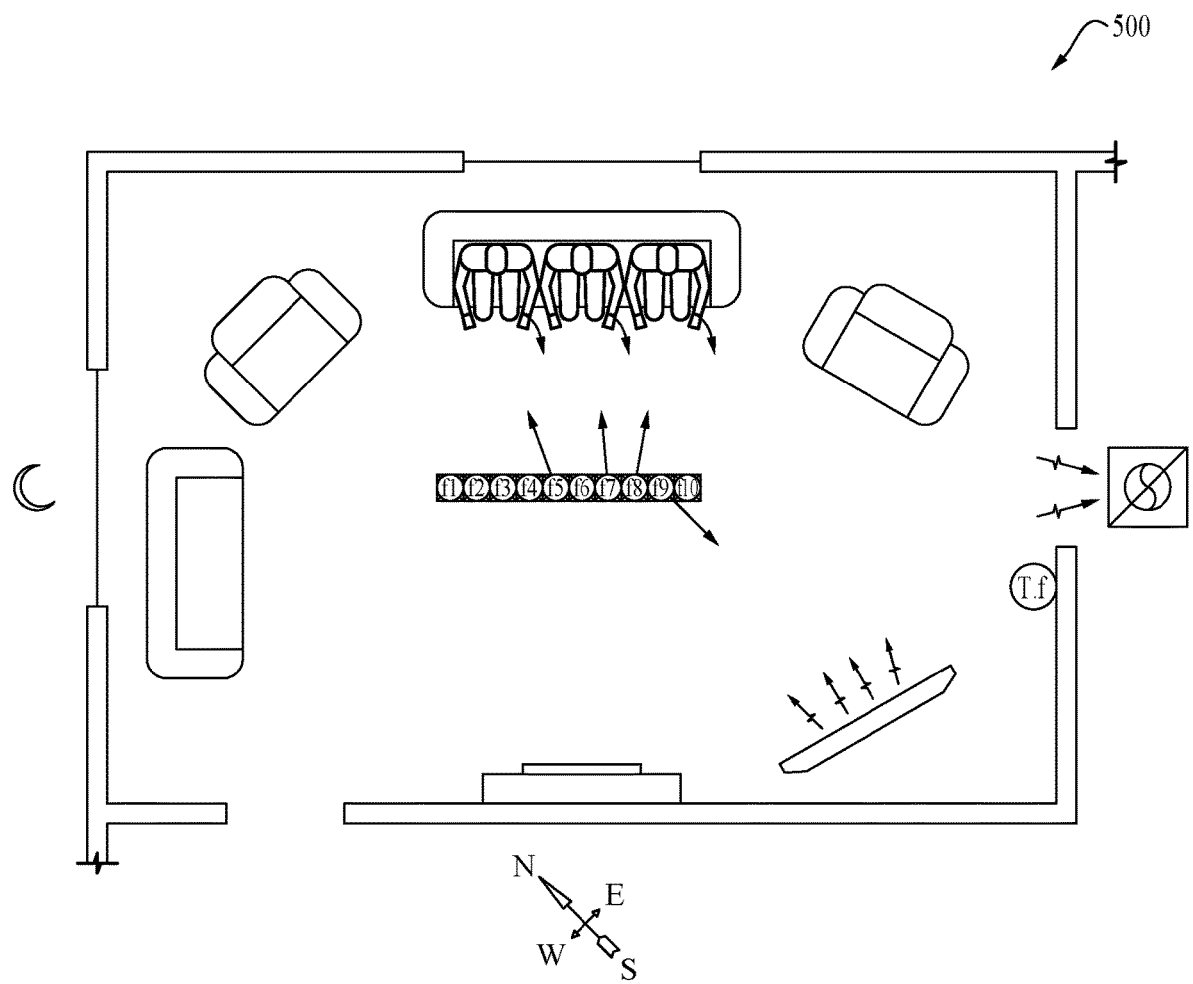
Figure 18:
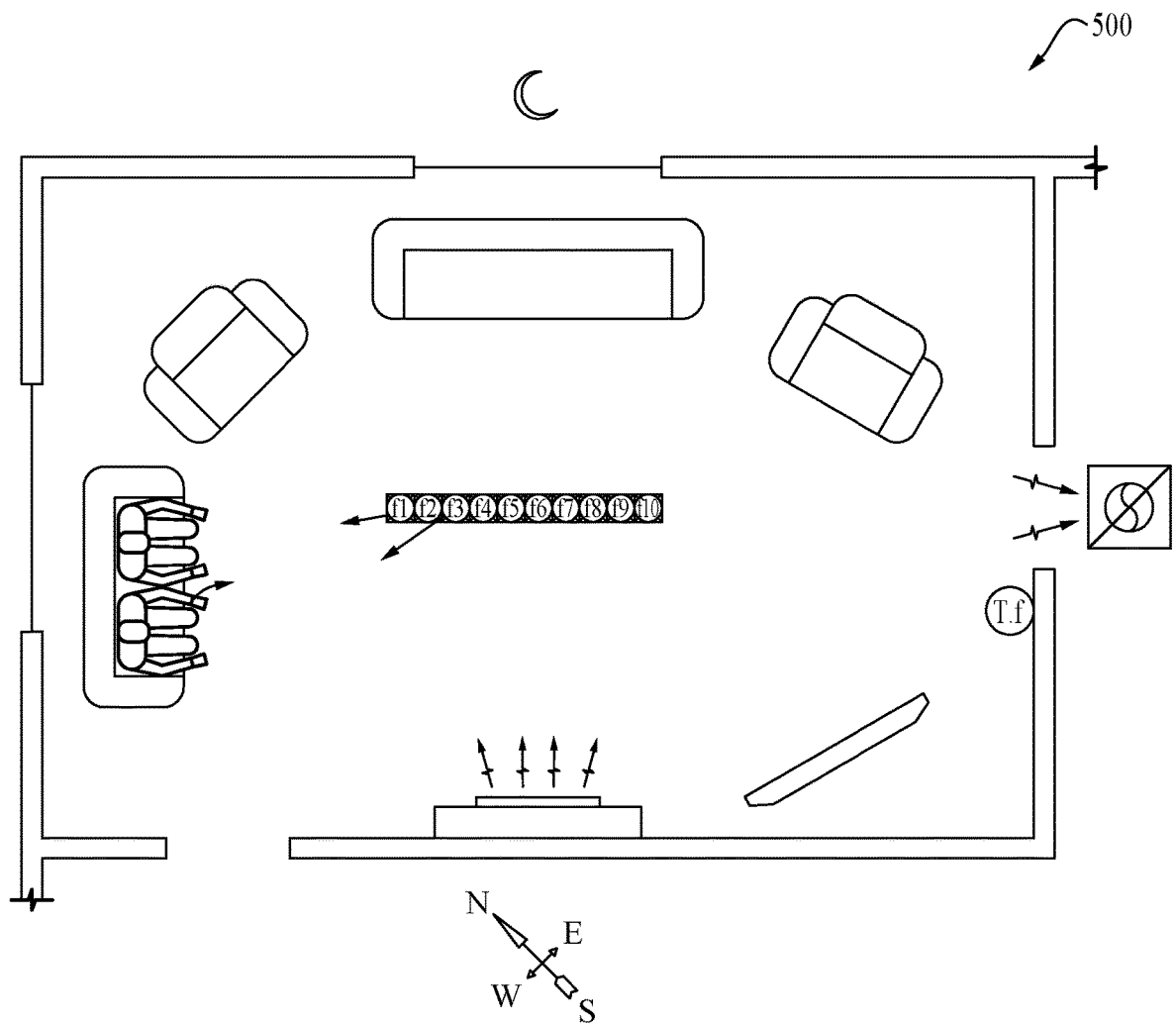

As depicted in FIG. 16, in a similar manner as FIG. 15, an occupant is now located where they can be served by zone 4 and now sunlight has now moved to where zone fan 8 would become active. As depicted in FIG. 17, none of the zones are active for a presumably temperate evening (Note: outdoor conditions could be accounted for by additional sensing and programming provisions), Zone fan 5, 7 and 8 are active through the detection of wearable devices and corresponding set-points, zone fan 9 would be active through interlocks and programming to mitigate heat gain from the internal load of the video device. As depicted in FIG. 18, in a similar manner as FIG. 17, occupants are now enjoying a fire and but only one has a wearable device. In this scenario it is presumed the internal load of the fire is intentional and would be factored integrated into the temperature reading at the room sensor, Tf although it is possible to dedicate a zone to counter the effects of the internal load of the fire if only the 'ambiance' was desired. Also in this scenario, zone fan 2 would be active by tracking the occupant's wearable device, but the activation of zone fan 3 would require a manually programmed over-ride through software accessed via an app or other programming device. The advantage of the enhanced embodiment would be to provide a greater precision for directing the minimum conditioned air resources to the actual loads required. For the example above, a multitude of scenarios exist and not every provision could be addressed within the constraints of current technology and the possibilities of future technology.

According to some example embodiments, artificial intelligence and/or algorigmithic sequences can be incorporated with the systems of the present invention so as to promote the development and attainability of a unique sensing algorithm for each user or occupant, for example, that would be unique to each of the particular users. In example embodiments, one or more particular occupants may inherit a sensing algorithm for example, such that systems of the present invention can accurately predict and anticipate the location where the particular occupant's needs may need to be met in a particular room and/or zone or a location within the room on a particular time and day, and deliver the desired unique air conditioning needs.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

While the invention has been described with reference to example embodiments, it will be understood by those skilled in the art that a variety of modifications, additions and deletions are within the scope of the invention, as defined by the following claims.

What is claimed is:

1. A variable air flow air conditioning system for conditioning the air of multiple zones of a structure comprising:
   a plurality of ducts extending from the air conditioning unit to each of the multiple zones;
   a plurality of variable speed fans, wherein at least one fan is positioned to communicate within a respective duct between the air conditioning unit and the multiple zones;
   a plurality of zone sensors, wherein at least one zone sensor is positioned within each respective zone of the multiple zones;
   a plurality of occupancy sensors;
   a plurality of air flow sensors wherein at least one air flow sensor is positioned within each respective duct so as to obtain the volumetric flow rate of conditioned air flowing from the air conditioning unit; and,
   a controller configured to communicate with the air conditioning unit, the variable speed fans and the air flow sensors, wherein the central controller activates or deactivates so as to dynamically increase or decrease the volumetric flow rate of the plurality of fans so as to optimize the degree of control for each of the multiple zones as demanded by thermal loads of the plurality of zones, the thermal loads being determined by reference to setpoints that may update based on the time, date, and/or the presence or absence of one or more people within one or more zones as determined by the occupancy sensors, and wherein the central controller adjusts the speed of each individual fan of the plurality of fans to provide a volume of air flow to match the thermal load of the zone that is served while maintaining a net volumetric flow rate through the heat transfer element of the air conditioning unit at a preset volumetric air flow rate dynamically determined by the thermal capacity of the system and the user performance goals.

2. The variable air flow air conditioning system of claim 1, wherein the occupancy sensor comprise motion detectors.

3. The variable air flow air conditioning system of claim 1, wherein the occupancy sensors comprise the zone controllers.

4. The variable air flow air conditioning system of claim 1, wherein in the occupancy sensors comprise wearable devices.

5. The variable air flow air conditioning system of claim 1, wherein the occupancy sensors comprise smart appliances.

6. The variable air flow air conditioning system of claim 1, wherein the occupancy sensors comprise smart phones.

7. The variable air flow air conditioning system of claim 1, wherein the system makes setpoint determinations based on the presence or absence of a particular user.

8. The variable air flow air conditioning system of claim 7, wherein the system makes further setpoint determinations based on a hierarchy of users within a zone.

9. The variable air flow air conditioning system of claim 1, wherein the occupancy sensors communicate directly with the zone sensors.

10. The variable air flow air conditioning system of claim 1, wherein the occupancy sensors communicate directly with the controller.

11. A variable air flow air conditioning system for conditioning multiple zones of a structure comprising:
an air conditioning unit comprising a heat transfer element;
a plurality of ducts extending from the air conditioning unit to each of the multiple zones;
a plurality of variable speed fans, wherein at least one fan is positioned to communicate within a respective duct between the air conditioning unit and the multiple zones;
a plurality of zone sensors, wherein at least one zone sensor is positioned within each respective zone of the multiple zones;
a plurality of occupancy sensors;
a plurality of air flow sensors wherein at least one air flow sensor is positioned within each respective duct so as to obtain the volumetric flow rate of conditioned air flowing from the air conditioning unit; and
a controller configured to adjust the speed of the variable speed fans so as to maintain a set volumetric airflow through the air conditioning unit while delivering a portion of the volumetric airflow to each zone according to the thermal demand of the preset parameters and the thermal demand of each zone, wherein the thermal demand is determined in part by the difference between a current state of one or more zones and one or more setpoints, wherein the setpoints may be dynamically determined.

12. The variable air flow air conditioning system of claim 11, wherein the setpoints for each zone are determined based on the presence or absence of one or more people within one or more zones.

13. The variable air flow air conditioning system of claim 12, wherein the setpoints for each zone are determined based on the presence or absence of a particular user within a zone.

14. The variable air flow air conditioning system of claim 13, wherein the system further determines setpoints based on a hierarchy of users within the zone.

15. The variable air flow conditioning system of claim 11, wherein the system chooses heating or cooling mode based on the preferences of a majority of users currently within the zones.

16. The variable air flow conditioning system of claim 11, wherein the system may delay updating setpoints until after a person has entered a zone and remained there for a period of time, or left a zone without reentering for a period of time.

17. The variable air flow conditioning system of claim 11, wherein multiple zones are within the same room, and the system chooses setpoints based on the proximity of one or more people to that zone.

18. A method for determining the amount of air received by each zone in a variable air flow air conditioning system, the variable air flow system including an outdoor compressor, an indoor heat transfer unit and heat pump, the structure having ducts connected between the indoor heat transfer unit and each zone, each of the ducts having an individual fan in communication therewith to draw air from the indoor heat transfer unit and across a coil to the desired zone at a desired rate, so long as the sum of the volumetric air flows through the ducts remains at a preset volumetric air flow rate, the method comprising:
determining the presence or absence of one or more people in one or more zones;
determining set points for each zone based on the presence or absence of one or more people in the one or more zones;
calculating a desired thermal load for each zone by comparing the state of each zone to a corresponding state determined by the set points;
calculating a desired air flow rate for each zone according to the desired thermal load for each zone;
summing the individual zone desired air flow rates to generate an instantaneous net volumetric air flow rate for the entire air volume moving across the heat transfer unit;
comparing the measured net volumetric air flow rate to a preset volumetric air flow rate; and,
proportionally adjusting the individual air flow rates to maintain the instantaneous measured net volumetric air flow rate at the preset volumetric air flow rate as if there were a single fan operating the system.

19. The method of claim 18, further comprising selecting setpoints based on a particular person's presence within a zone.

20. The method of claim 19, further comprising selecting the setpoints based on a hierarchy when multiple people are within the same zone.

* * * * *